US 6,510,696 B2

(54) THERMOELECTRIC AIR-CONDITION APPARATUS

(75) Inventors: Glen D. Guttman, Tel Aviv (IL); Rami A. Drori, Zur-Yig'al (IL)

(73) Assignee: Entrosys Ltd., Netanya (IL)

( * ) Notice: Subject to any disclaimer, the term of this patent is extended or adjusted under 35 U.S.C. 154(b) by 0 days.

(21) Appl. No.: 09/737,450

(22) Filed: Dec. 14, 2000

(65) Prior Publication Data

US 2002/0124574 A1 Sep. 12, 2002

Related U.S. Application Data

(63) Continuation-in-part of application No. PCT/IL98/00280, filed on Jun. 15, 1998, and a continuation-in-part of application No. PCT/IL98/00281, filed on Jun. 15, 1998.

(51) Int. Cl.[7] .................................................. F25B 21/02
(52) U.S. Cl. .............................. 62/3.3; 62/3.7; 62/259.3
(58) Field of Search .............................. 62/3.3, 3.7, 3.2, 62/3.4, 3.61, 259.3, 239

(56) References Cited

U.S. PATENT DOCUMENTS

| | | | |
|---|---|---|---|
| 2,171,265 A | 8/1939 | Carlson | 244/78 |
| 2,928,253 A | 3/1960 | Lopp et al. | 62/3 |
| 3,085,405 A | 4/1963 | Frantti | 62/3 |
| 3,126,710 A | 3/1964 | Boehmer et al. | 62/3 |
| 4,146,933 A | 4/1979 | Jenkins et al. | 2/2 |
| 4,580,408 A | 4/1986 | Stuebner | 62/259.3 |
| 4,722,099 A | 2/1988 | Kratz | 2/79 |
| 4,777,802 A | 10/1988 | Feher | 62/3 |
| 4,905,475 A | 3/1990 | Tuomi | 62/3.3 |
| 5,146,757 A | 9/1992 | Dearing | 62/61 |
| 5,197,294 A | 3/1993 | Galvan et al. | 62/3.62 |
| 5,564,276 A | 10/1996 | Abadilla et al. | 62/3.7 |
| 5,687,573 A | 11/1997 | Shih | 62/3.6 |
| 5,713,208 A | 2/1998 | Chen et al. | 62/3.7 |

*Primary Examiner*—Henry Bennett
*Assistant Examiner*—Melvin Jones
(74) *Attorney, Agent, or Firm*—Ladas & Parry

(57) ABSTRACT

A thermoelectric air conditioning apparatus is comprised of a housing having a plurality of air inlets and a plurality of air outlets; a plurality of thermoelectric elements; two heat exchangers; a temperature regulator, having first and second air inlets, a main air outlet and at least one exhaust outlet; two air circulation units and a control unit. Thermoelectric elements are energized, and cause a reduction of temperature on one side and an increase of temperature on the other side. One air flow is forced to flow through one of the housing air inlets, over a heat exchanger and to the first air outlet of the temperature regulator. Another air flow is forced to flow through one of the housing inlets, over the other heat exchanger and to the second air outlet of the temperature regulator. The temperature of the air leaving the main outlet of the temperature regulator is determined by proportioning the flow of air from the first air inlet of the temperature regulator and the air flow from the second air inlet of the temperature regulator into and through the main outlet of the temperature regulator.

38 Claims, 22 Drawing Sheets

US 6,510,696 B2

THERMOELECTRIC AIR-CONDITION APPARATUS

This Application is a CIP of PCT/IL98/00280 filed Jun. 15, 1998; and a CIP of PCT/IL98/00281 filed Jun. 15, 1998.

THE FIELD OF THE INVENTION

The invention relates to an thermoelectric air condition apparatus. The invention also relates to an apparatus for air-conditioning a motorcyclist.

BACKGROUND OF THE INVENTION

This invention relates to an air-condition apparatus, based on thermoelectric elements.

Thermoelectric apparatus based on peltier effect thermoelectric elements are well known. U.S. Pat. No. 5,713,208 describes a thermoelectric cooling apparatus, based on thermoelectric elements, which is used to cool an object. U.S. Pat. No. 5,197,294 describes a thermoelectric apparatus for air-conditioning a protective body suit, using thermoelectric elements. The thermoelectric apparatus of both patents can either cool its user or warm its user. The apparatus is coupled to a D.C. voltage supply. A user can reverse the polarity of D.C. voltage supply, causing the thermoelectric apparatus to change its mode from cooling to heating. A disadvantage of the prior art apparatuses is that this change takes a relative long period, because a side that was hot has to start cooling, and vice verse. Another disadvantage of the prior art is that frequent changes in the polarity of the D.C. voltage supply to the thermoelectric elements can shorten the life time period of the thermoelectric elements. Another disadvantage of the mentioned apparatuses is the disability to control the temperature of the air flow which exits the thermoelectric device. Yet another disadvantage of air-condition apparatuses using a thermoelectric element is the usage of thermoelectric elements both to cool air and to warm air. Thermoelectric elements are usually more expensive, and have a shorter life time period than heating coils.

Usually, the cold side of a thermoelectric element is connected to a first heat exchanger, and the hot side is connected to the second heat exchanger. When a thermoelectric element is activated, some of the electromagnetic energy supplied to the unit is "lost"—it turns into heat (i.e.—additional heat). The additional heat is channeled to the hot side of the thermoelectric element, and to the second heat exchanger. The second heat exchanger has to exchange more heat than the first heat exchanger, so that the second heat exchanger is usually larger than the first heat exchanger. Thermoelectric apparatus in which changing modes is done by reversing the polarity of the D.C. voltage supplied to the thermoelectric elements, have larger heat exchangers because both heat exchangers can be used to exchange the heat from the hot side.

Accordingly, there is a need for an air-condition apparatus based on thermoelectric elements which can allow fast and frequent changes of temperature. Accordingly, there is a need for an air-condition apparatus based on thermoelectric elements which can allow the regulation of the temperature of the air flow which exits the air-condition unit. Accordingly, there is a need for an air-condition apparatus, based on thermoelectric elements which allows to use other means then thermoelectric element, to warm air. Accordingly, there is a need for a non-symmetrical air-condition apparatus, based on thermoelectric elements which has one side which can exchange more heat than the other side.

This invention also relates to an air-condition apparatus for a motorcyclist, based on thermoelectric elements.

Thermoelectric elements based on the peltier effect are well known. For example, U.S. Pat. Nos. 4,146,933 and 5,197,294.

Apparatuses for cooling a motorcyclist are well known. For example, U.S. Pat. No. 4,722,099 describes a protective motorcycle garments for maximum cooling which allows ambient air to flow through the garments. The air which flows through the garment is not cooled, so that the cooling effect is very limited, and depends on the ambient air temperature. CAN. patent application No. 2,171,265 describes a motorcycle helmet having a thermoelectric device. The thermoelectric device cools only the inner space of the helmet, has relative low cooling power, and being located near the motorcyclist head can cause the motorcyclist severe head damage as a result of an accident. The thermoelectric device is relatively heavy, it can electrify the motorcyclist and the motorcyclist wearing the thermoelectric device has to exert an effort to continuously balance helmet.

A disadvantage of all the mentioned devices is the disability to control the temperature of the air flow which exits the apparatus. A disadvantage of air conditioning devices using a thermoelectric element is the use of thermoelectric elements both to cool air and to warm air. Thermoelectric elements are usually more expensive, and have a shorter life period than heating coils.

Accordingly, there is a need for an air-condition apparatus for a motorcyclist, that can cool the motorcyclist when the ambient air is hot. Accordingly, there is a need for an air-condition apparatus for a that is not mounted on the head of the motorcyclist. Accordingly, there is a need for an air-condition apparatus for a motorcyclist that can cool more than a motorcyclist head. Accordingly, there is a need for an air-condition apparatus for a motorcyclist that can allow the motorcyclist to regulate the temperature of the air flow which exits the apparatus. Accordingly, there is a need for an air-condition apparatus for a motorcyclist that allows to heat the motorcyclist with other means than thermoelectric elements. Accordingly, there is a need for an air-condition apparatus which allows to control the air flow which exits the apparatus.

SUMMARY OF THE INVENTION

The problem underlying the invention is basically solved by applying the features laid down in the independent claims. Preferred embodiments are given in the dependent claims.

An advantage of the invention is that it provides an air-condition apparatus, based on thermoelectric elements which can allow the regulation of the temperature of the air flow which exits the air-condition apparatus. Another advantage of the invention is that it provides an air-condition apparatus based on thermoelectric elements which allows to use other means than thermoelectric element, to warm air. Yet another advantage of the invention is that it provides a compact size air-condition apparatus, based on thermoelectric elements. A further advantage of the invention is that it provides an air-condition apparatus, based on thermoelectric elements which allow fast and frequent changes of temperature. Yet a further advantage of the invention is that it provides an air-condition apparatus, based on thermoelectric elements which has one side which can exchange more heat than the other side.

DETAILED DESCRIPTION OF THE INVENTION

In the preferred embodiments disclosed herein, the invention is described in connection with the cooling and heating air. It is to be understood, however, that the principles of the invention are equally applicable to any fluid.

Figure 1:
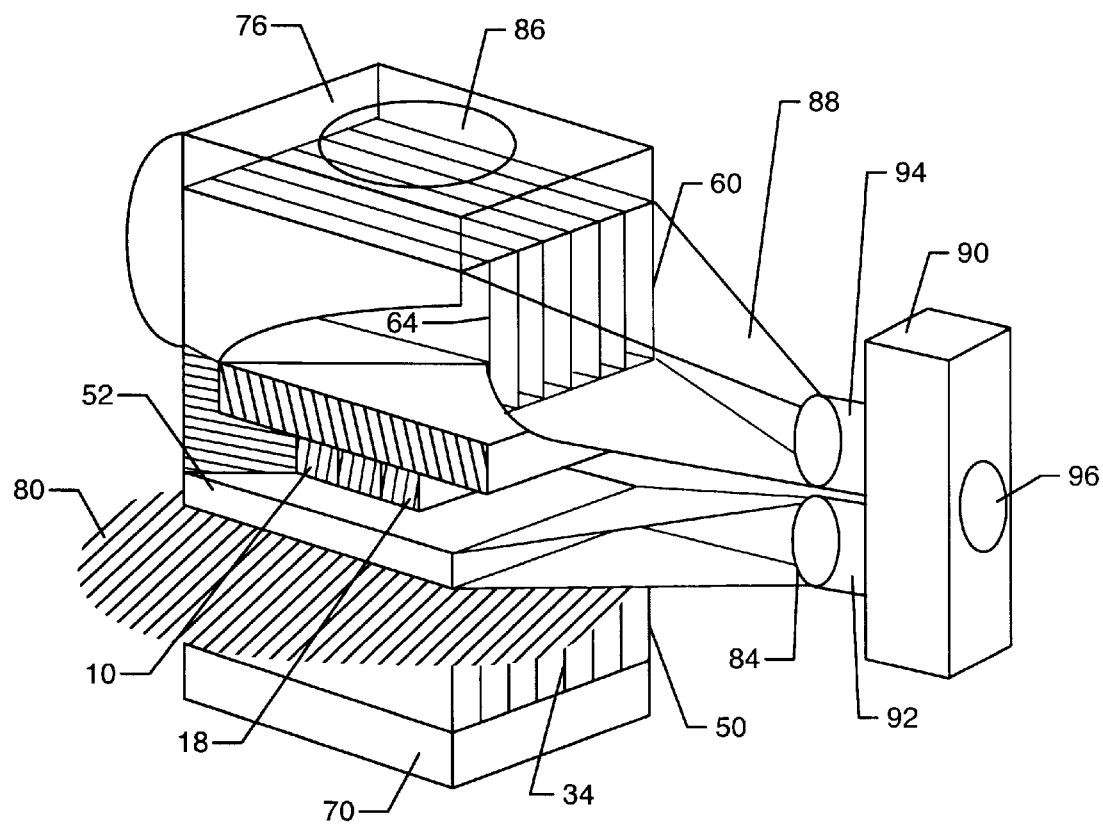
FIG. 1 is a perspective view of the main section of a thermoelectric air-condition apparatus, according to a preferred embodiment of the invention.
Figure 1A:
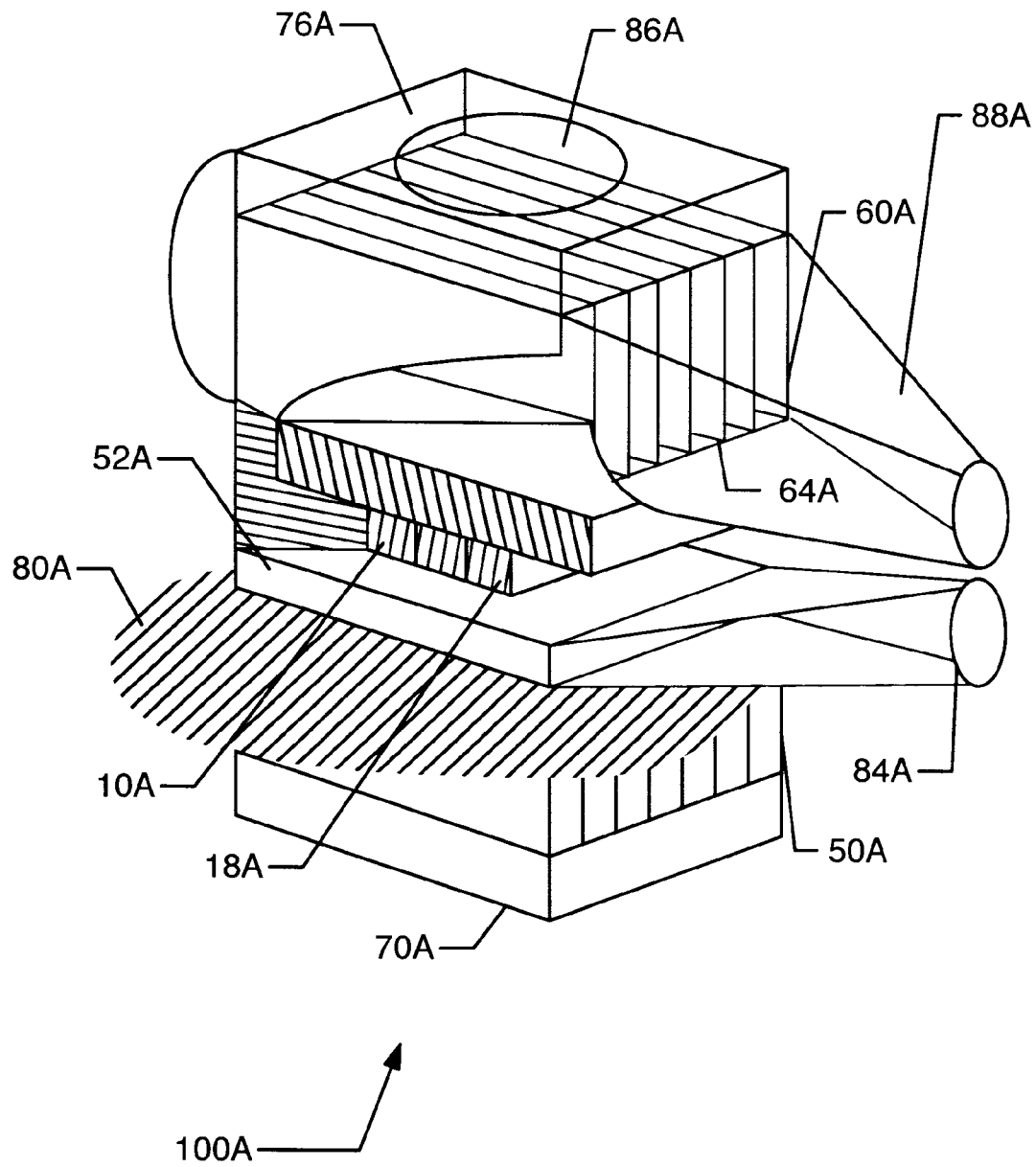
FIG. 1A is a perspective view of the main section of a thermoelectric air-condition apparatus, according to a preferred embodiment of the invention.
Figure 2:
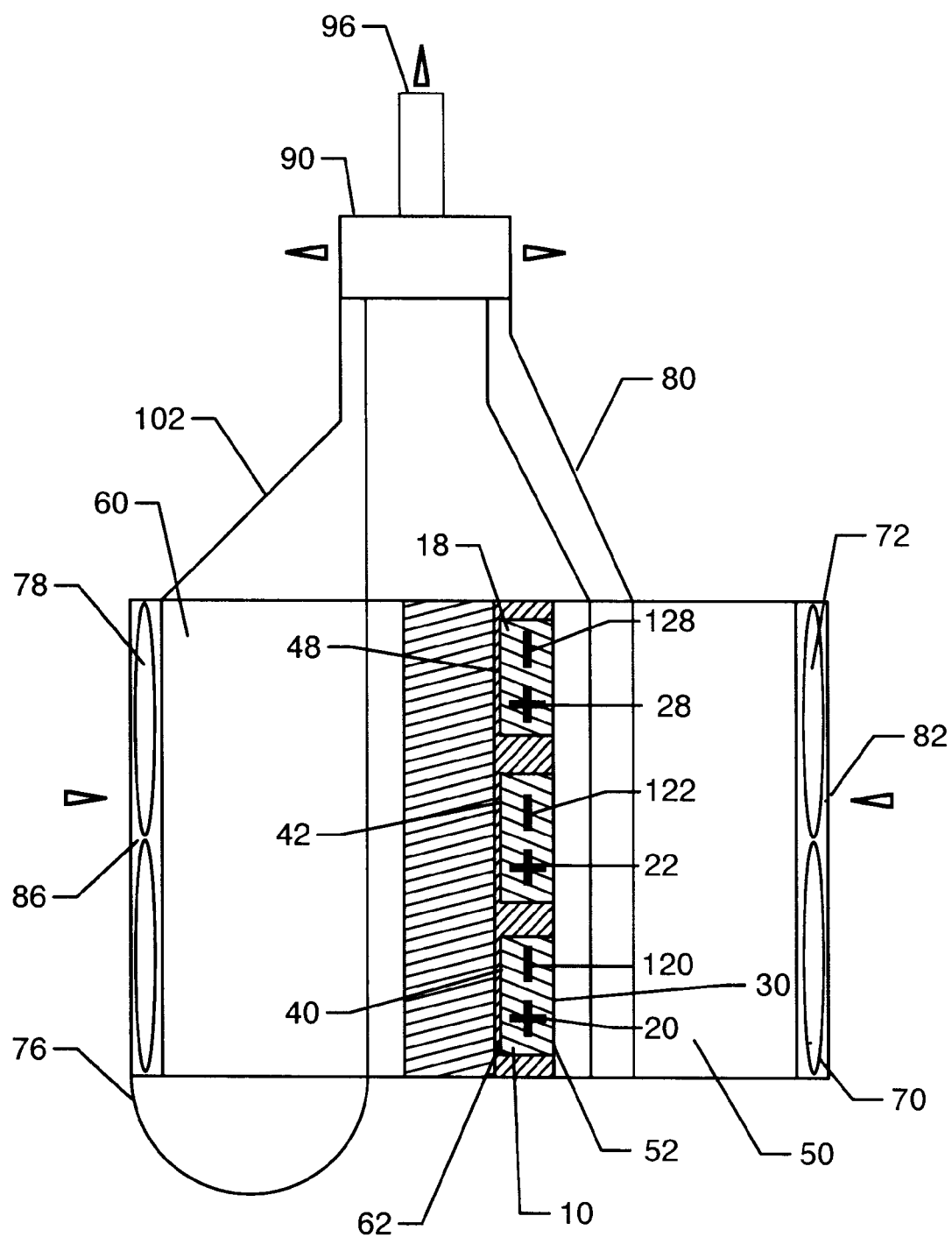
FIG. 2 is a cross sectional view of the main section of a thermoelectric air-condition apparatus, according to a preferred embodiment of the invention.
Figure 2A:
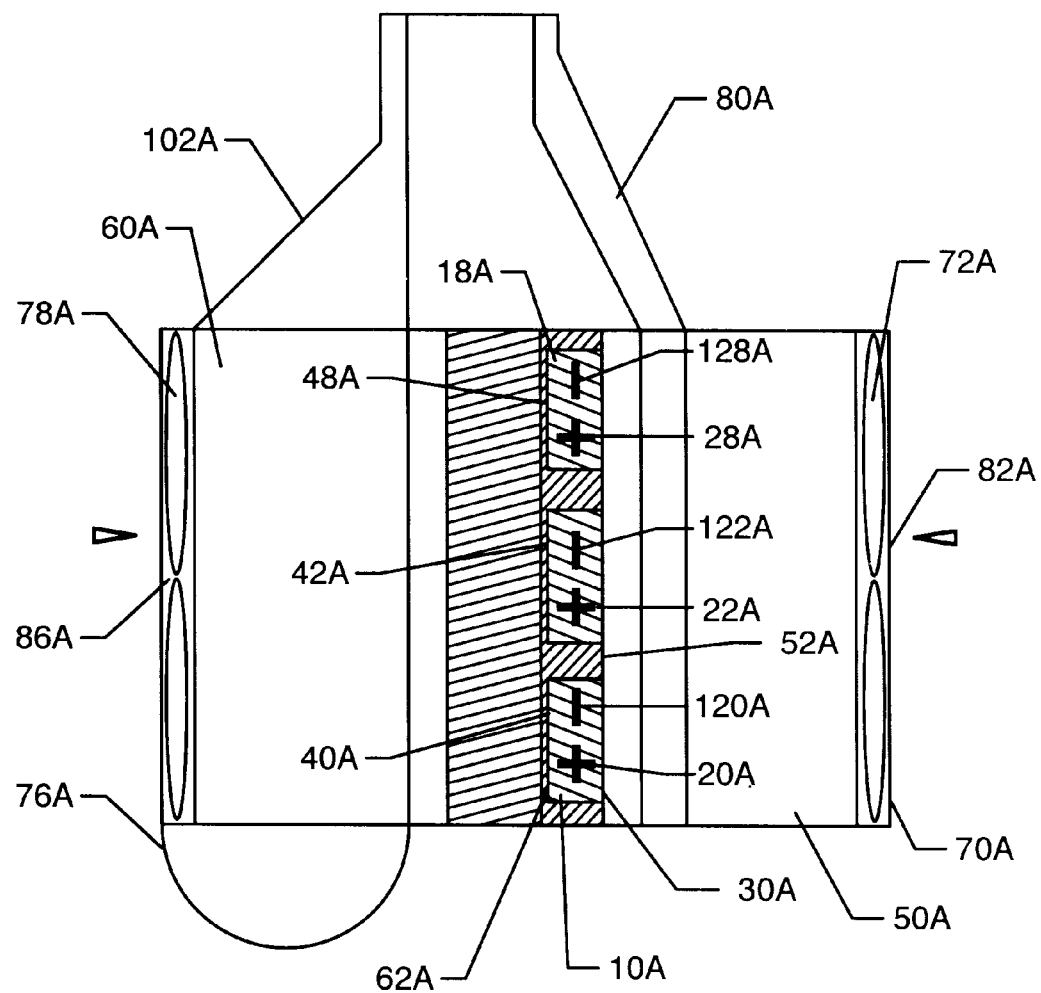
FIG. 2A is a cross sectional view of the main section of a thermoelectric air-condition apparatus, according to a preferred embodiment of the invention.

FIGS. 1–2 are a perspective view and a cross sectional view of the main section 102 of a thermoelectric air condition apparatus (i.e.—TACA) 100, according to a preferred embodiment of the invention. Main section 102 is connected to a temperature regulator 90, which is shown in FIGS. 3–5 and FIGS. 6–8, and coupled to a control panel 130, shown in FIG. 10.

Section 102 of TACA 100 is comprised of:

A plurality of thermoelectric elements (i.e.—TE) 10–18, having first set of inputs 20–28, and a second set of inputs 120–128, both for receiving D.C. voltage. TE 10–18 have two opposite base plates: first pase plates 40–48 and second base plates 30–38. Creating a voltage difference between a first input and second input of one of TE 10–18 results in a electrical current which passes through that TE and causes a reduction of temperature in TE first base plates (i.e.—cold side) 40–48 and an increase of temperature in TE second base plates (i.e.—hot side) 30–38. Some of the first and second sets of inputs 20–28 and 120–128 can be connected in parallel to the voltage supply, and some of the first and second sets of inputs 20–28 and 120–128 can be connected in series. Preferably, the first set of inputs 20–28 and the second set of inputs 120–128 are connected in parallel to the power supply. Those who are skilled in the art will understand that reversing the polarity of the D.C. voltage inputted to first set of inputs 20–28 and second set of inputs 120–128 causes first sides 30–38 to become cold and second sides 40–48 to become hot. For convenience, the hot side of TE 10–18 are denoted as 30–38 and the cold side of TE 10–18 are denoted as 40–48.

Two heat exchangers 50, 60, having bases 52, 62 respectively. Base 52 of the first heat exchanger 50 is thermally coupled to sides 30–38 of TE 10–18. For convenience, the first heat exchanger 50 is referred to as the hot heat exchanger 50. Base 62 of the second heat exchanger 60 is thermally coupled to sides 40–48 of TE 10–18. For convenience, the second heat exchanger 60 is referred to as the cold heat exchanger 60. Conveniently, cold sides 40–48 of TE 10–18 are connected to spacers, made of heat conductive material. The spacers have two sides, wherein one side is connected to the cold sides 40–48 and the other side is connected to base 62 of second heat exchanger. The space between the TE 10–18, the base 62 of the second heat exchanger 60 and the base 52 of the first heat exchanger 50 are filled with a heat insulating material. TE 10–18 remain thermally coupled to first and second heat exchangers 50 and 60.

A plurality of spaced projections 54, are projected from base 52 and are integrally formed with said base 52. Preferably, the spaced projections 54 are shaped like plain fins or pin fins, which are orthogonal to base 52. A plurality of spaced projections 64, are projected from base 64 and are integrally formed with said base 62. Preferably, the spaced projections 64 are shaped like plain fins or pin fins, which are orthogonal to base 62.

Housing 80, surrounding the TE 10–18, the cold heat exchanger 60, has a plurality of fluid (i.e.—air) inlets and a plurality of fluid (i.e.—air) outlets. For conveyance of explanation, and without limiting the scope of the invention, housing 80 is regarded as having two fluid inlets—a hot fluid (i.e.—air) inlet 82, and cold fluid (i.e.—air) inlet 86, and having two fluid (i.e.—air) outlets—a hot fluid (i.e.—air) outlet 84 and a cold fluid (i.e.—air) outlet 88. Both air inlets 82 and 86, are used to input ambient air into TACA 100. At least a part of hot heat exchanger 50, is within housing 80. Housing 80 outer surface is made of heat insulating material. Conveniently, the inner part of housing 80, which surrounds the cold heat exchanger 60 is made of a heat conductive material. Those who are skilled in the art will appreciate that a temperature regulator (denoted as 90 in FIG. 2) can be installed within housing 80, so that housing 80 will have a main air outlet (denoted as 96 in FIG. 2), and a plurality of air exhaust outlets (not shown in FIG. 1).

Figure 3:
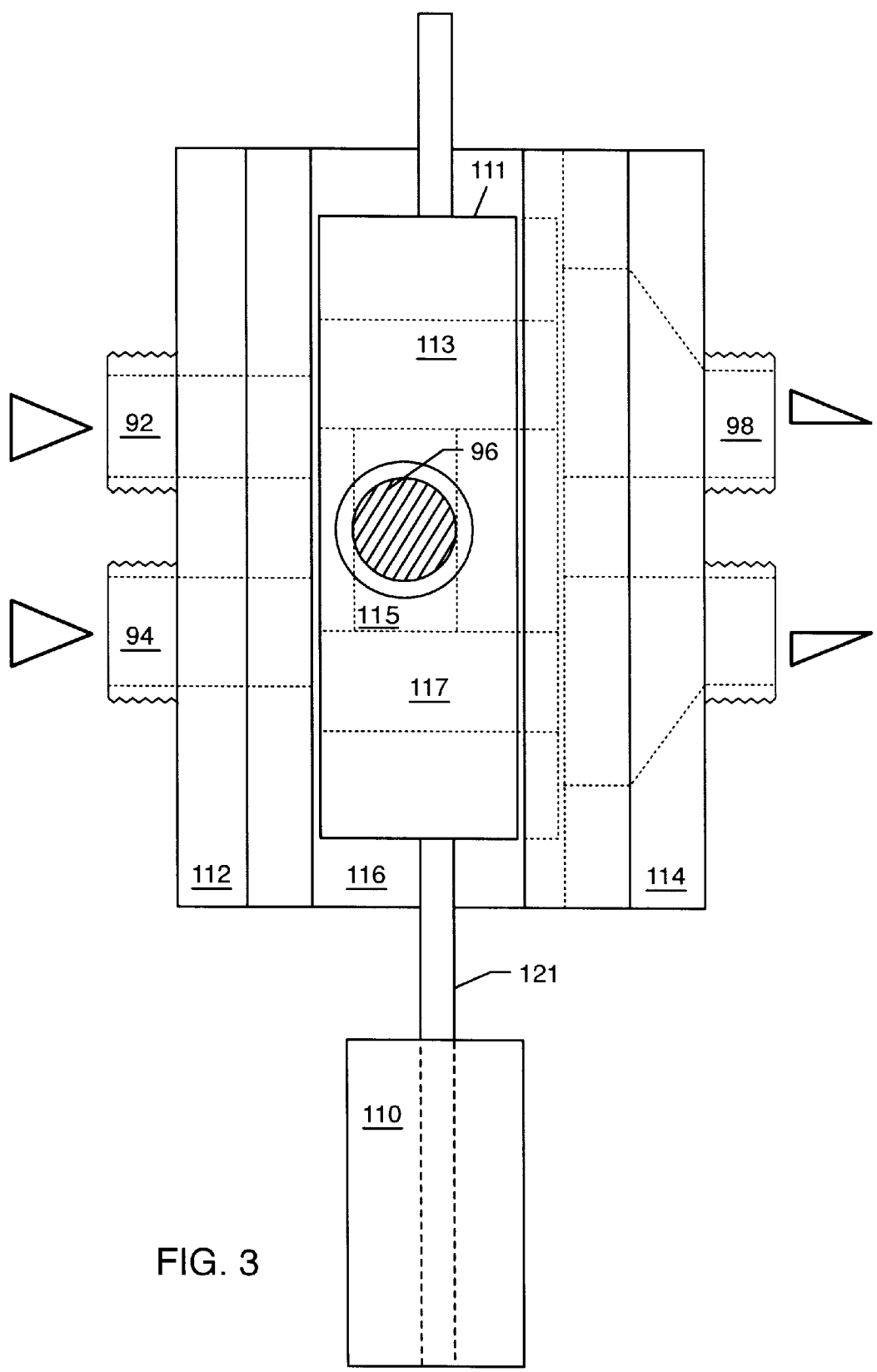
FIG. 3 is a top view of temperature regulator, according to a preferred embodiment of the invention.
Figure 3A:
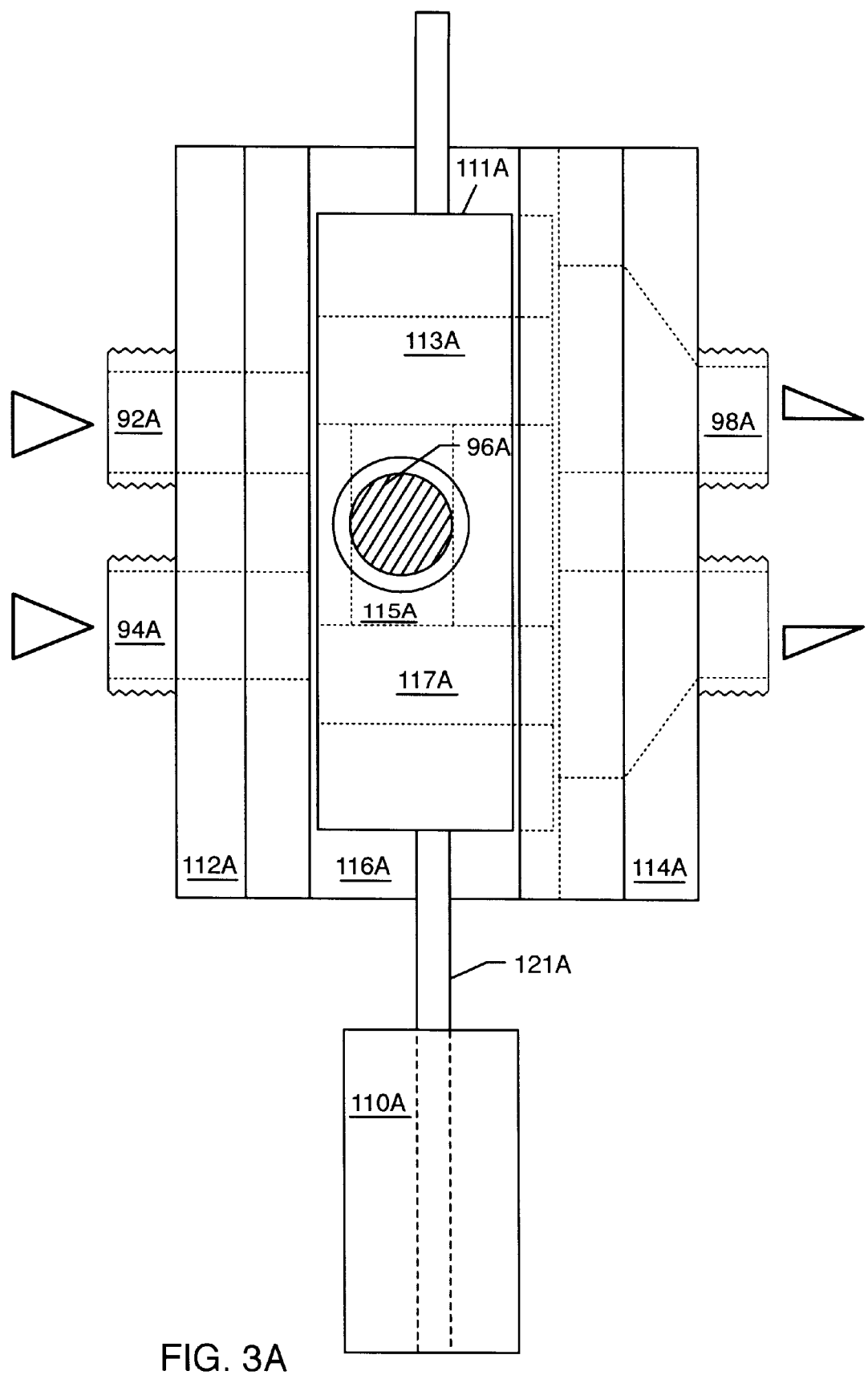
FIG. 3A is a top view of a temperature regulator, according to a preferred embodiment of the invention.

First fluid (i.e.—air) circulation unit 70, sucks fluid and conviently ambiant air by means of a first fan, pump or blower 72, and forces the fluid to flow, through housing hot fluid inlet 82, over the spaced projections 54 of the hot heat exchanger 50, thus undergoing an increase of temperature before being forced through first fluid inlet 92 of temperature regulator 90 (temperature regulator 90 is further shown in FIG. 3). For convenience, said fluid (i.e—air) flow is refereed to as hot air stream 120. First air circulation unit 70 can also have a first filter 74, placed between housing 80 hot air inlet 82 and the first fan, pump or blower 72, for removing dirt particles in the sucked ambient air.

Second fluid (i.e.—air) circulation unit 76, sucks fluid, and conviently ambient air by means of a second fan, pump or blower 78, and forces the fluid (i.e.—air) to flow, through housing 80 cold air inlet 86 and over the spaced projections 64 of the cold heat exchanger 60, thus undergoing a reduction of temperature before being forced through second air inlet 92 of temperature regulator 90. For convenience, said air flow is refereed to as cold air stream 126. Second air circulation unit 76 can also have a second filter 78, placed between housing 80 cold air inlet 86 and the second fan, pump or blower 78, for removing dirt particles in the sucked ambient air.

Those who are skilled in the art will understand that the hot heat exchanger 50 can be cooled by a hose, made of heat conducting material, in which a cooled air is circulated, wherein the close hose is connected to the hot heat exchanger.

For example, housing 80 can have a single air inlet (not shown in FIG. 1), wherein the air which flows through the single air inlet is split. The air can be forced through TACA 100 by a single air circulation unit (not shown in FIG. 1).

Figure 10:
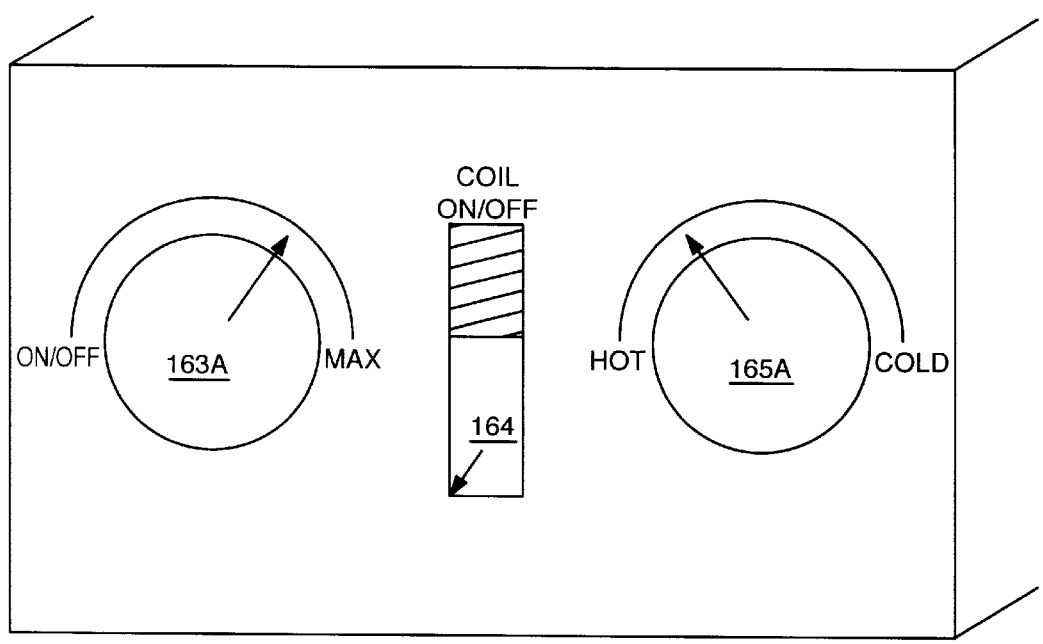
FIG. 10 is a detailed description of the control unit panel, according to a preferred embodiment of the invention.

A control unit 130 (not shown in FIG. 1, but an analogues control unit, denoted as 160 is shown in FIG. 10), having a TE control output, a temperature regulating output, a on/off switch and a temperature regulation switch. Control unit 130 controls the voltage and current supply to inputs 20–28 of TE 10–18, and controls the temperature regulator 90, to allow TACA 100 to supply an output air stream having a selected temperature out of a large range of temperatures.

Those who are skilled in the art will appreciate that TACA 100 can act as a dehumidifier, especially when the temperature of the air flowing through the main air outlet equals the temperature of the ambient air.

Figure 4:
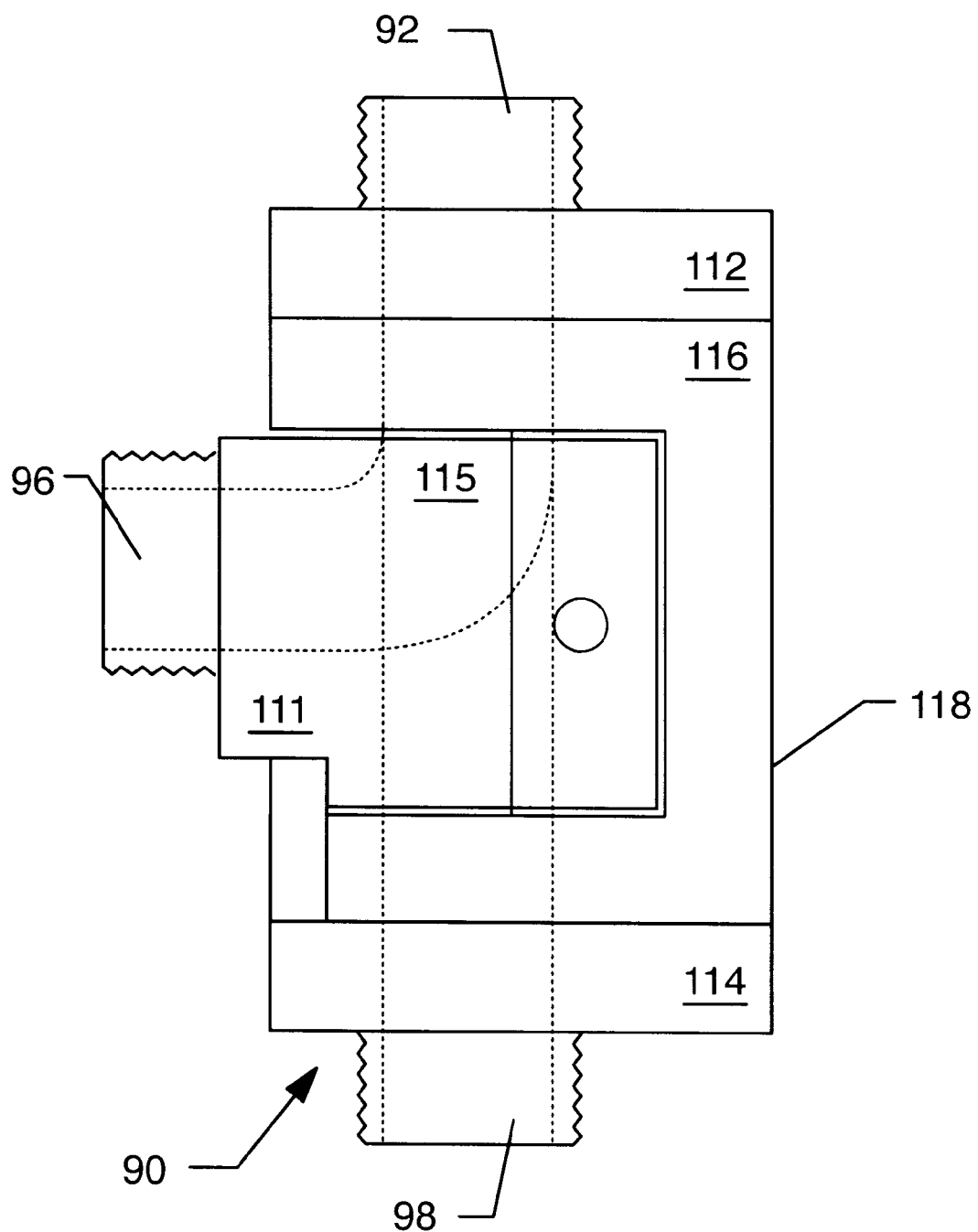
FIG. 4 is a side view of temperature regulator, according to a preferred embodiment of the invention.
Figure 4A:
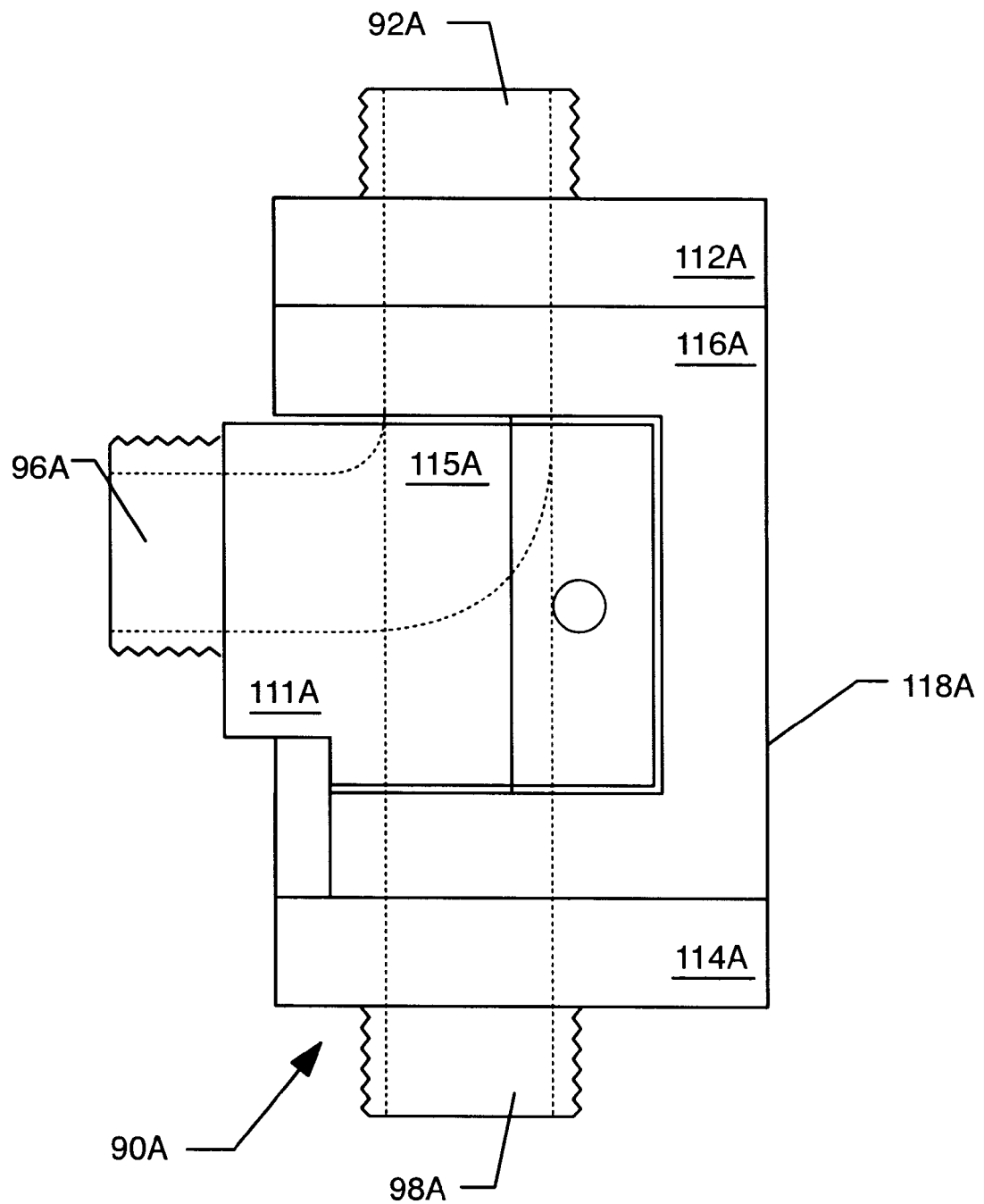
FIG. 4A is a side view of a temperature regulator, according to a preferred embodiment of the invention.
Figure 5:
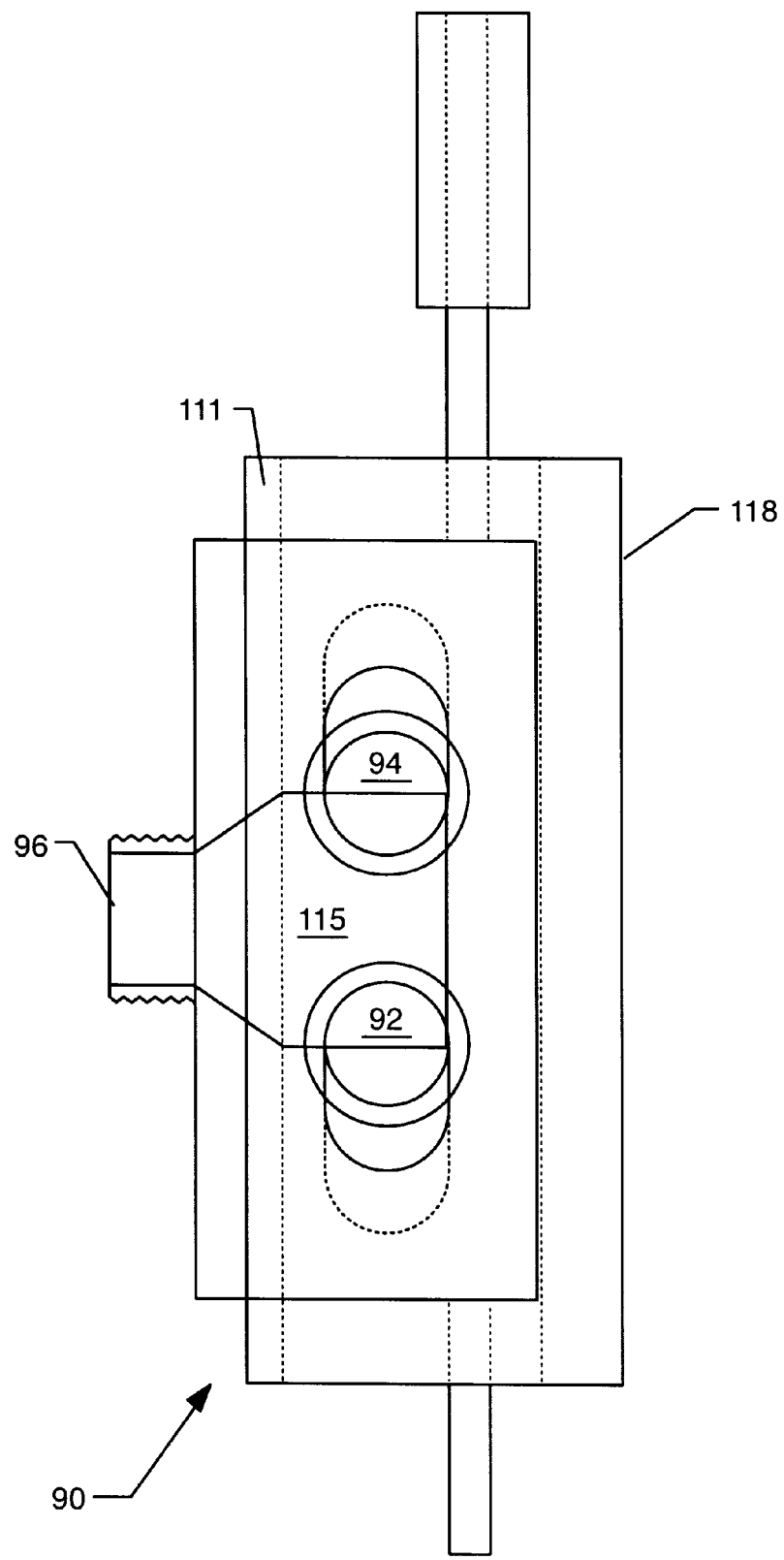
FIG. 5 is a front view of temperature regulator, according to a preferred embodiment of the invention.
Figure 5A:
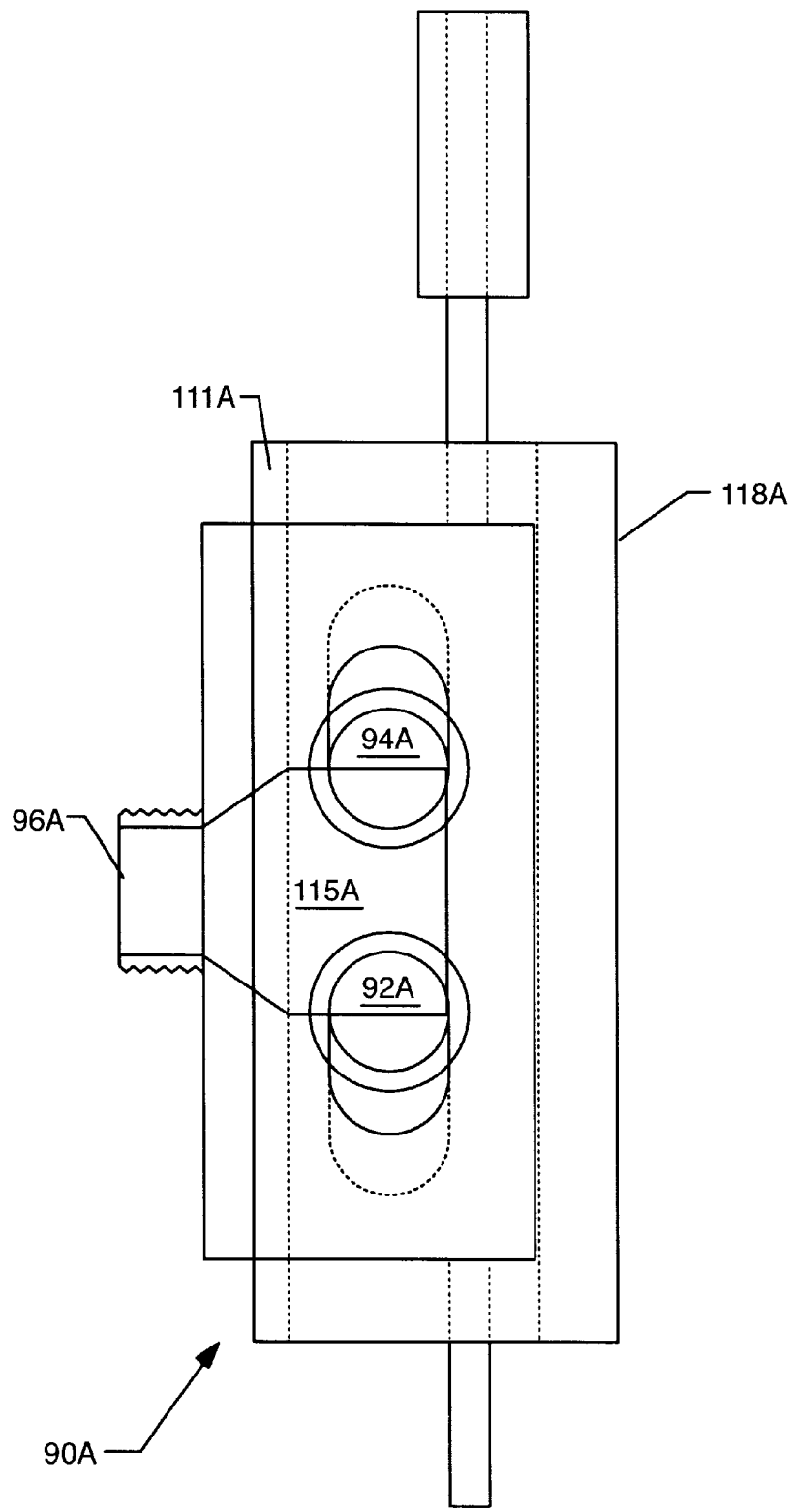
FIG. 5A is a front view of a temperature regulator, according to a preferred embodiment of the invention.

FIGS. 3–5 are a top view, a side view and a front view of temperature regulator 90, according to a preferred embodiment of the invention.

Temperature regulator 90 is comprised of three parts 112, 114 and 116, preferably of rectangular shape, a base 118, a sheave 121 and a servo motor 110. Base 118 is connected to lower sides of all three parts 112, 114 and 116. First part 112 has a first air inlet 92 and a second air inlet 94. Second part 114 preferably has a first air exhaust outlet 98 and a second exhaust outlet 100. Second part 114 conveniently has one exhaust outlet 99 (not shown in FIGS. 3–5), instead of first and second air exhaust outlets 98, 100.

Third part 116 has a main air outlet 96 and a piston 111 which travels in the space confined by the first part 112, the second part 114 and the base. Piston 111 can various shapes, according to the space confined by the first and second parts 112 and 114 of temperature regulator 90, in which piston 111 can travel. Piston 111 has an ability to travel perpendicular to the first air inlet 92, the second air inlet 94, the first air exhaust outlet 98 and to the second air exhaust outlet 100. Piston 111 has 3 cavities. First cavity 113 allows the flow of air from the first air inlet 92 to the first air exhaust outlet 98. Second cavity 115 allows the air flow from the first and second air inlet 92 and 94 to the main exhaust outlet 96. Third cavity 117 allows the flow of air from the second air inlet 94 to the second air exhaust outlet 100. Second cavity 115 preferably is larger then first cavity 113 and third cavity 117.

Piston 111 is connected to a sheave 121. Sheave 121 is preferably connected to a servo engine 110. Servo engine has control inputs 123, for receiving control signals from control unit 130. Control unit 130 sends the servo engine 123 control signals which causes the sheave, and the piston to travel in the space confined by the first and second parts 112 and 114 of temperature regulator 90.

In another embodiment of the invention, sheave 121 is connected to a lever (not shown in FIGS. 3–5 and 6–8 ) and not to servo engine 123. The lever can be moved manually.

The first, second and third cavity 113,115 and 117 fully overlap the first air inlet 92 and the second air inlet 94, so that the air that flows through the first and second air inlets 92 and 94 flows through one of more of the three cavities 113, 115 and 117, and through the main air outlet 96 and a least one of the first and second air exhaust outlets 98 and 100.

The temperature of the air leaving the main air outlet 96 is determined by proportioning the flow of air from the first air inlet 92 and the second air inlet 94 into and through the main air outlet 96. The proportioning is done by moving piston 111 in a way which changes the relative overlapping between the second cavity 115 and the first and second air inlets 92 and 94. For example, if the air condition apparatus user needs a flow of cold air, the piston 111 is moved so that the second cavity 115 will overlap just the second air inlet 94 so that the cold air flow 126 flows from the second air inlet, through the second cavity 115 and to the main air outlet 96. The hot air flow 120 flows from the first air inlet 92, through the first cavity 113 to the first air exhaust outlet 98. If, for example, the air condition apparatus user needs a warmer air flow, the piston 111 is moved so that the second cavity 115 will also partly overlap the first air inlet 92.

Those who are skill in the art will appreciate that temperature regulator 90 can have an auxiliary exhaust outlet 99 (not shown in FIGS. 3–5 and 6–8), instead of first and second air exhaust outlets 98, 100. Second cavity 115 allows the air flow from the first and second air inlet 92 and 94 to the main exhaust outlet 96.

In a further embodiment of the invention, the second exhaust outlet 100 of temperature regulator 90 is connected to a second insulating hose 170, having a smaller cross section then hot air inlet 82. Second insulating hose 170 is connected to hot air inlet 82, so that both cooled air from hose 170 and ambient air are sucked by first air circulating unit 70, amounting in an improved heat discharge of hot air exchanger 50.

Figure 6:
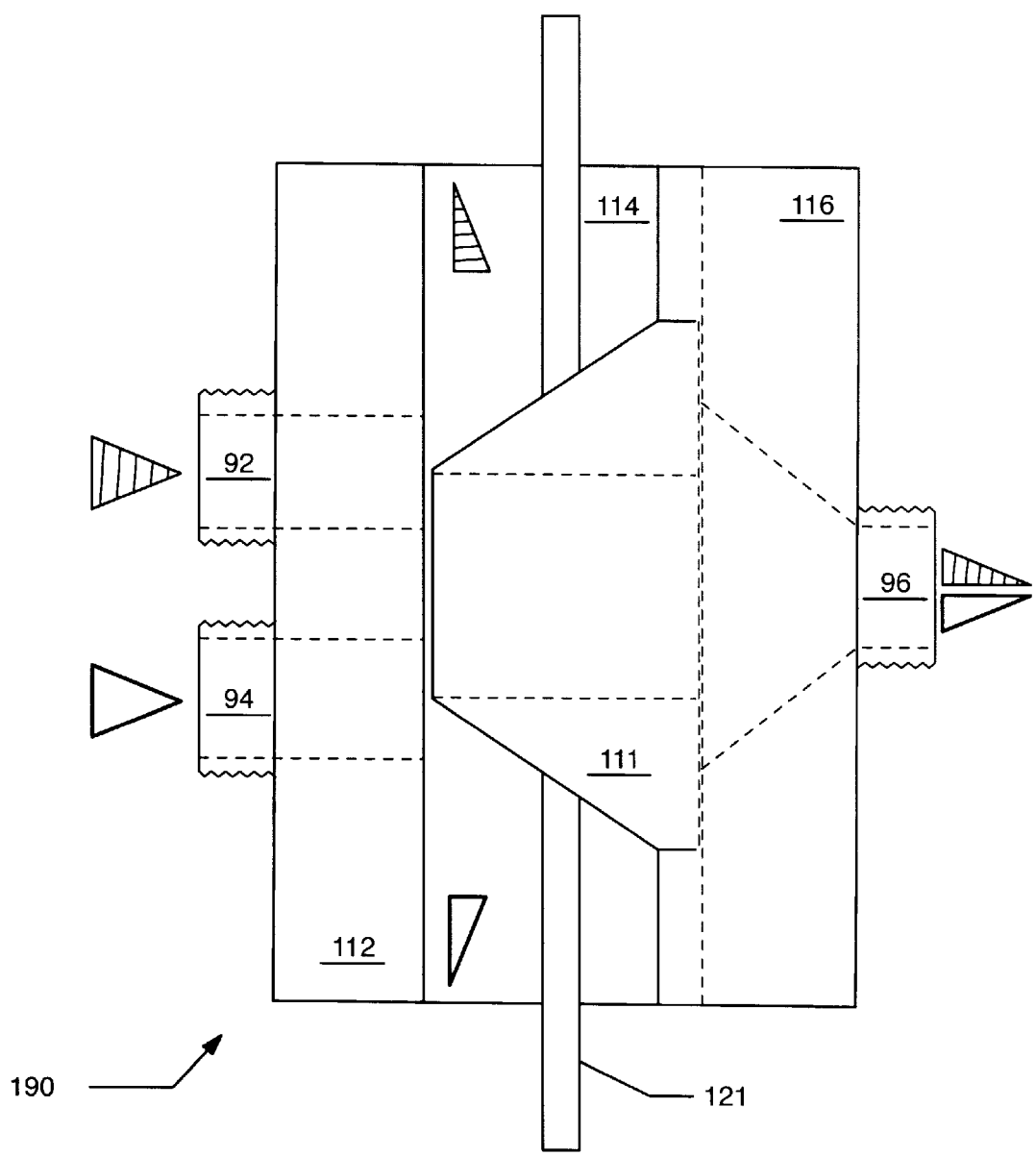
FIG. 6 is a top view of temperature regulator, according to another preferred embodiment of the invention.
Figure 6A:
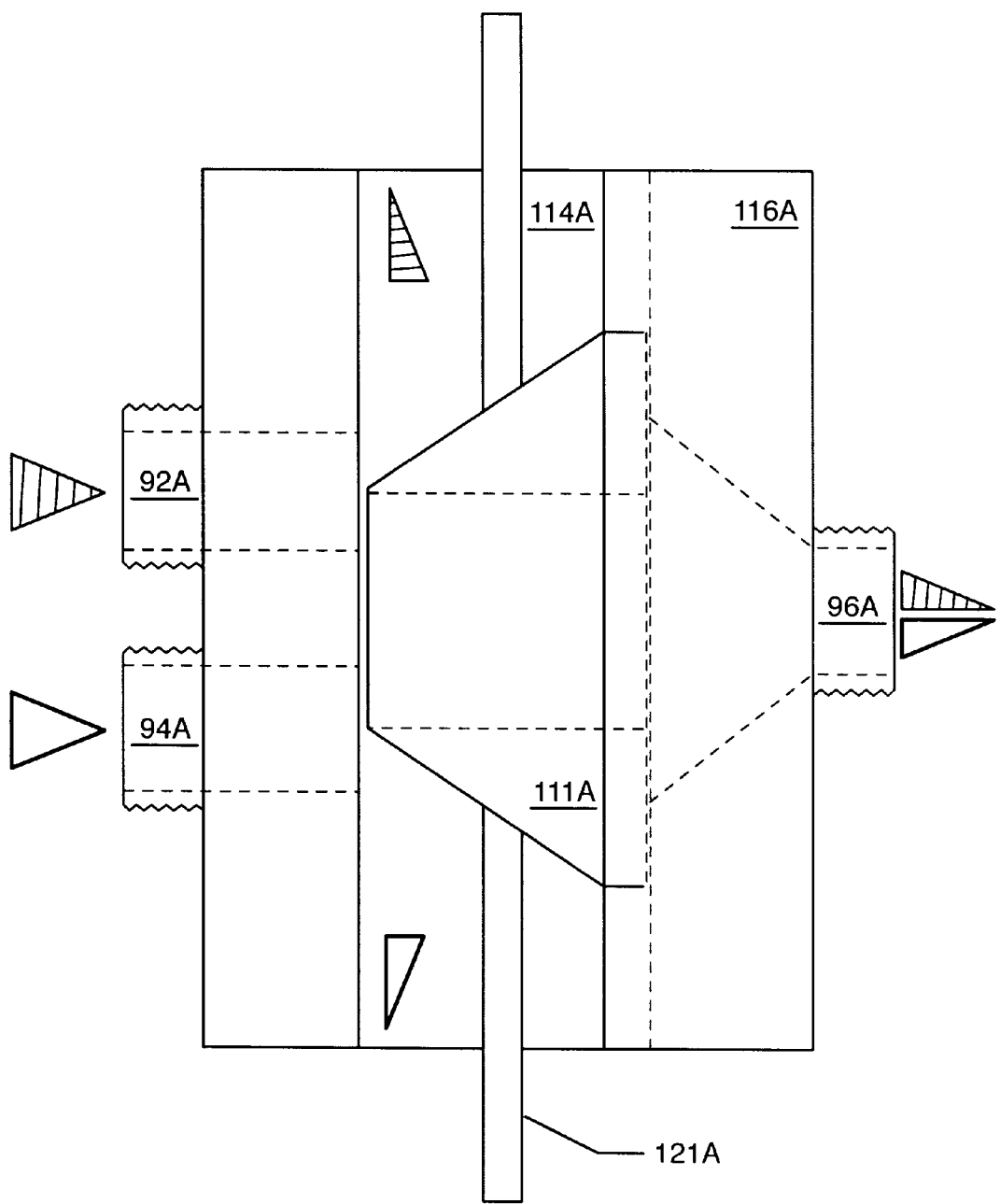
FIG. 6A is a top view of a temperature regulator, according to another preferred embodiment of the invention.
Figure 7:
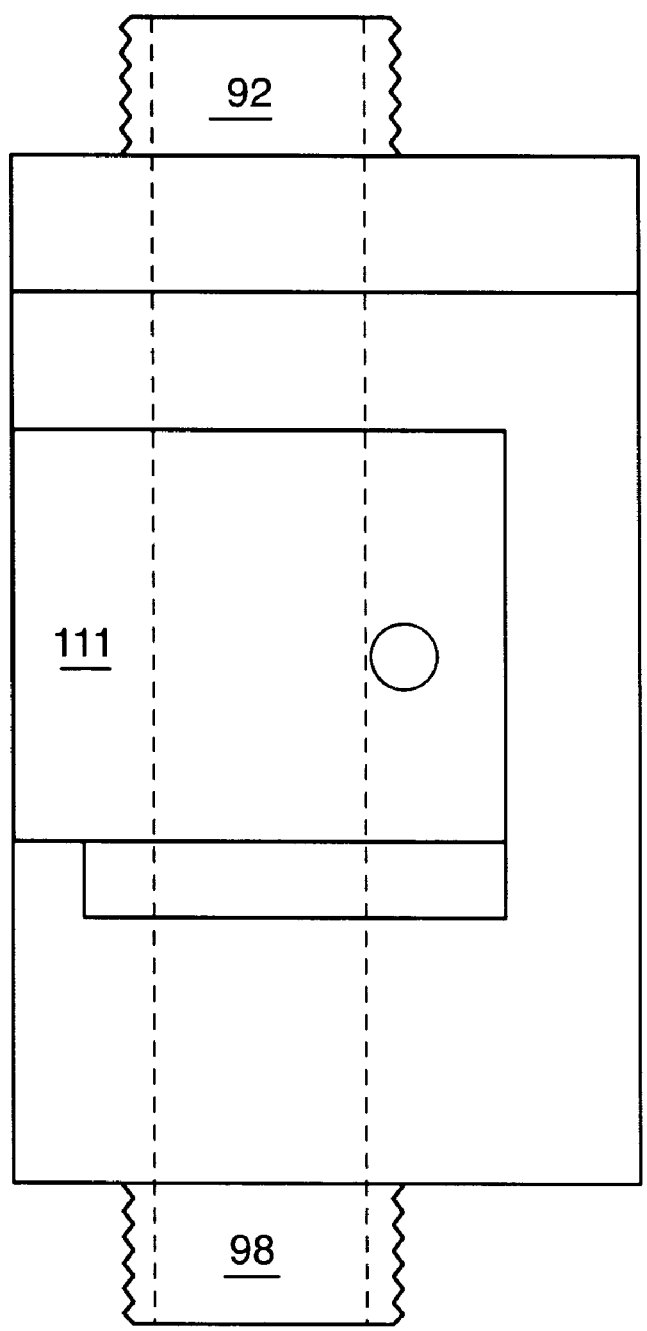
FIG. 7 is a side view of temperature regulator, according to another preferred embodiment of the invention.
Figure 7A:
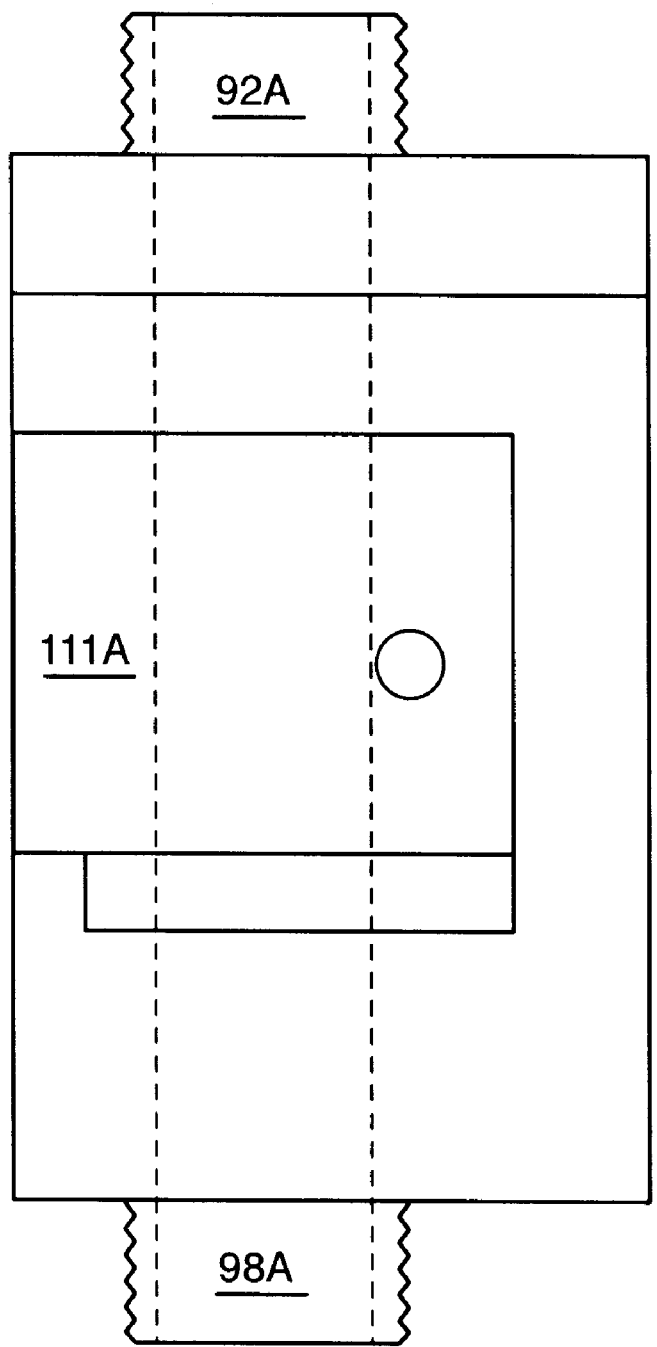
FIG. 7A is a side view of a temperature regulator, according to another preferred embodiment of the invention.
Figure 8:
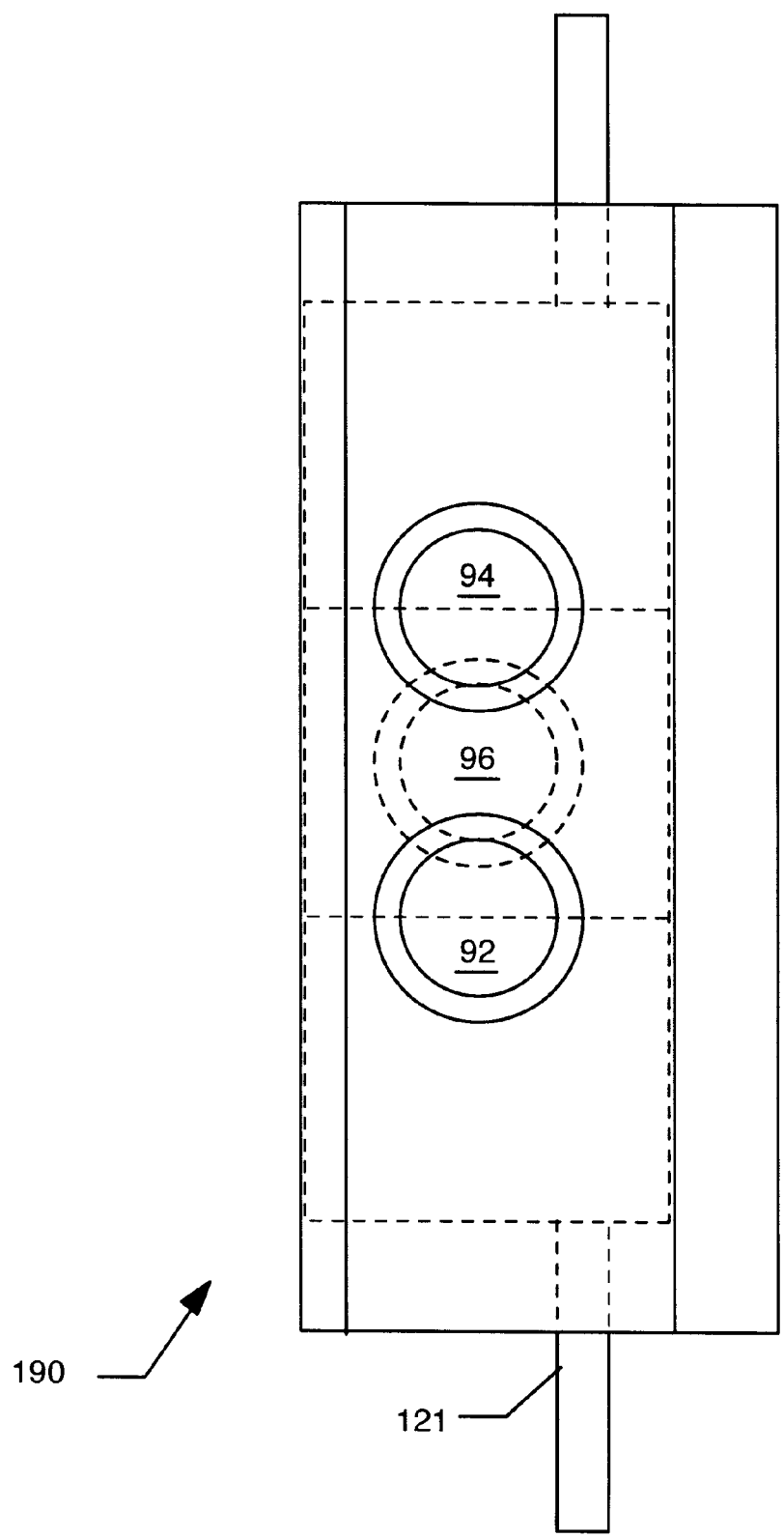
FIG. 8 is a front view of temperature regulator, according to another preferred embodiment of the invention.
Figure 8A:
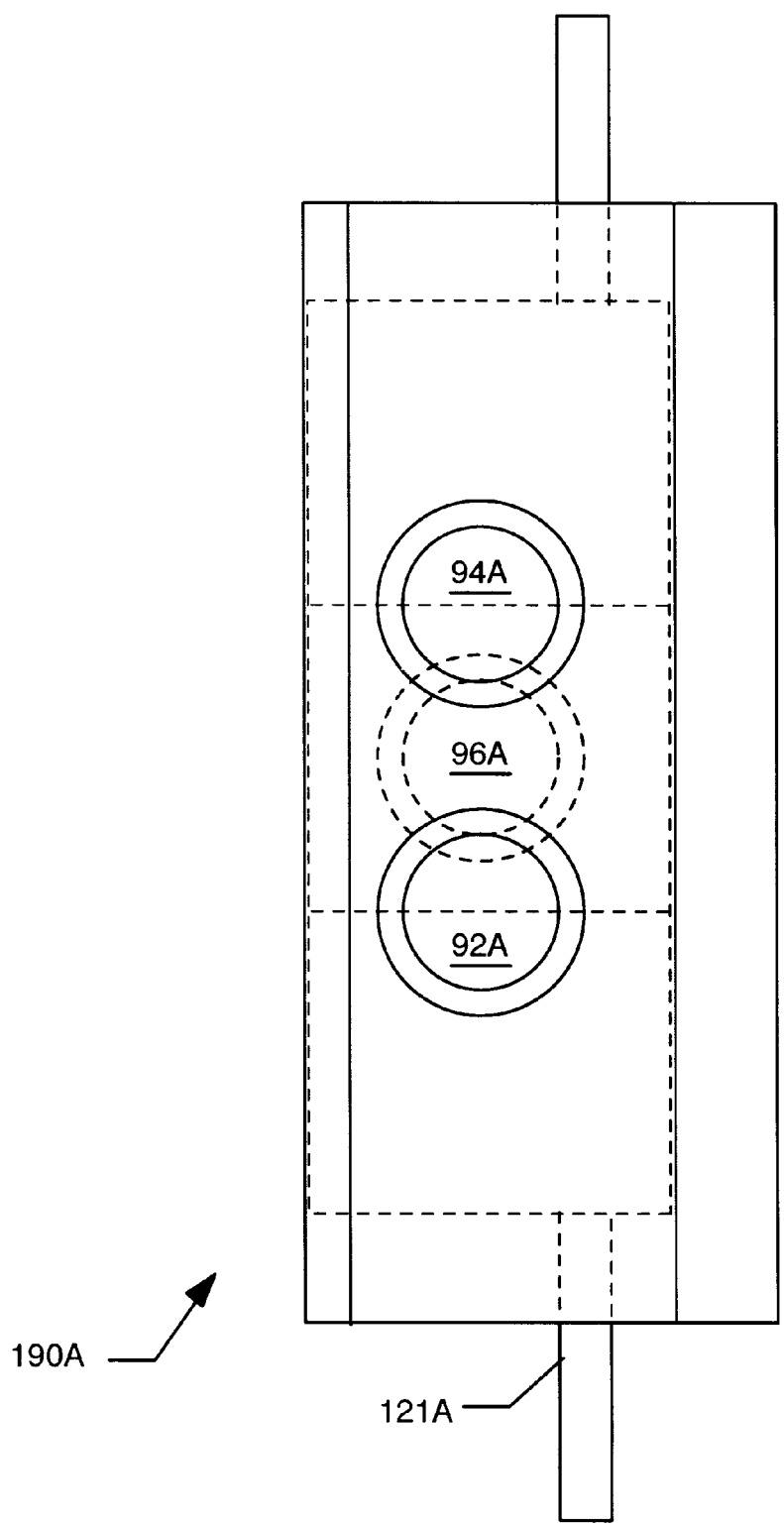
FIG. 8A is a front view of a temperature regulator, according to another preferred embodiment of the invention.

FIGS. 6–8 are a top view, a side view and a front view of temperature regulator 190, according to another preferred embodiment of the invention. Temperature regulator 190 is analogous to temperature regulator 90 except for the following Second part 114' has the main exhaust outlet 96' of temperature regulator 190.

Third part 116' has the first and second exhaust outlets 98' and 100'.

Piston 111' of temperature regulator 190 has just one cavity 115', analogous to second cavity 115 of temperature regulator 90. Cavity 115' allows the air flow from the first and second air inlets 92' and 94' to the main exhaust outlet 96'. Piston 111' of FIGS. 6–8 can be shorter than piston 111 of FIGS. 3–5, allowing exhausted air (i.e.—the air which does not flow through main exhaust outlet 96') to flow through a space confined by piston 111' first part 112', second part 114' and base 118'.

Figure 9:
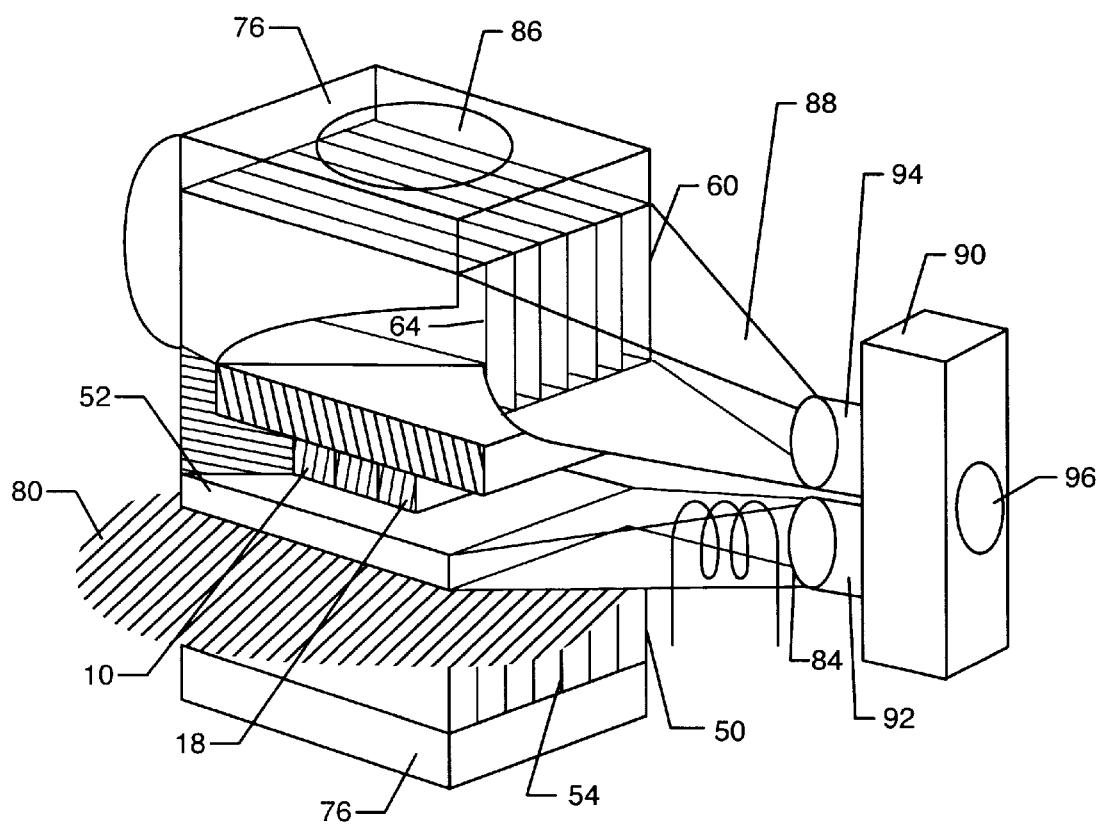
FIG. 9 is a perspective view of the main section of a thermoelectric air condition apparatus, according to another preferred embodiment of the invention.

FIG. 9 is a perspective view of the main section 102' of a thermoelectric air condition apparatus (i.e.—TACA) 100', according to another preferred embodiment of the invention. Main section 102' is connected to a temperature regulator 90, which is shown in FIG. 2, and is coupled to a control panel 160, shown in FIG. 10. Section 102' is analogues to main section 102 shown in FIG. 1, and the only difference between main section 102 and main section 102' is the addition of a heating element 140.

Heating element 140, is installed within housing 80. Heating element 140 is preferably placed between the hot air exchanger 50 and the hot air outlet 84, but it can also be placed in other locations within housing 80. Preferably, most or all of heating element 140 is located within the path of the hot air flow 120. More conveniently, heating element 140 has a spiral shape, wherein its main axis is parallel to the path of hot air flow 120.

Heating element 140 has two inputs, wherein supplying electromagnetic energy to the heating element causes it to radiate heat.

Preferably, heating element 140 is activated instead of TE 10–18. First air circulation unit 70, sucks ambient air by means of a first fan or a blower 72, and forces the air to flow, through housing hot air inlet 82, over the spaced projections 54 of the hot heat exchanger 50, and over heating element 140, thus undergoing an increase of temperature before being flown through hot air outlet 84 of housing 80 to a first air inlet 92 of temperature regulator 90. Second air circulation unit 76, sucks ambient air by means of a second fan or a blower 78, and forces the air to flow, through housing 80 cold air inlet 86, over the spaced projections 64 of the cold heat exchanger 60 through cold air outlet 88 of housing 80, to a second air inlet 94 of temperature regulator 90. Because TE 10–18 are not activated this air stream does not undergo a reduction of temperature within TACA 100.

Control unit 160 activates heating element 140, and preferably does not activate TE 10–18. A stream of ambient air will flow to the second air inlet 92 of the temperature regulator 90 and a stream of ambient air will flow over the heating element 140 and into the first air inlet 94 of the temperature regulator 90.

FIG. 10 is a detailed description of the control unit 160 panel 162, according to a preferred embodiment of the invention. Panel 162 preferably has a rectangular shape.

Panel 162 has a first control knob 163 for activating TACA 100 and for controlling the strength of the air flow, and the intensity of cooling and heating done by TE 10–18 or the heating element, a first switch 164 for determining whether to activate the heating element 140 or TE 10–18 and a second control knob 165 for controlling temperature regulator 90 and consequently determining the temperature of the air flow flowing out of the main air outlet 92. Control 130 panel 132 (not shown in FIG. 10) is analogues to control panel 160, but without the first switch 164.

First control knob 163 conveniently controls the level of D.C. voltage arriving to TE 10–18 inputs 20–28 and 120–128, and to fan or blowers 72,78 and to heating element 140. Preferably, the first control knob 163 also activates or deactivates the TACA 100. The D.C. voltage level can be changed by rotating the first control knob 163. The second control knob 165 controls the servo motor 110. If a lever replaces the servo motor 110, there is no need of the second control knob 165.

Those who are skilled in the art will appreciate that the control circuitry is simple, well known, and can be implemented in many ways. For example, the first control knob 163 can control an analog circuit having an output voltage which is proportional to the control signal arriving from first control knob 163. Said analog circuit can be a potentiometer.

In another embodiment of the invention, the control panel 160 includes additional control knobs (not shown in FIG. 10), which allow to control the level of D.C. voltage arriving to each of the following elements: TE 10–18, first fan or blower 72, second fan or blower 78, heating element 140.

Those who are skilled in the art will appreciate that the thermoelectric air condition apparatus, can be mounted on a motorcycle and used to cool and heat a motorcyclist. The thermoelectric air condition apparatus can be used to cool and heat a cockpit of an airplane or a cockpit of a helicopter, an micro-car, a tent, a sleeping bag. The thermoelectric air condition apparatus can also be used to cool and heat a patient, placed within a relatively confined space. The thermoelectric air condition apparatus can be coupled to a body suit or Jacket, for cooling and heating the wearer of the body suit or jacket.

Those who are skilled in the art will appreciate that various changes in form and detail can be made without departing from the spirit and scope of the invention which is determined in the claims that follow.

In the preferred embodiments disclosed herein, the invention is described in connection with the cooling and heating of a motorcyclist. It is to be understood, however, that the principles of the invention are equally applicable to any driver, rider or pilot of any vehicle or aircraft.

FIGS. 1A–2A are a perspective view and a cross sectional view of the main section 102A of a thermoelectric air condition apparatus (i.e.—TACA) 100A, according to a preferred embodiment of the invention. Main section 102A is coupled to a control unit 130A, shown in FIG. 10A.

Section 102A of TACA 100A is comprised of:

A plurality of thermoelectric elements (i.e.—TE) 10A–18A, having first set of inputs 20A–28A, and a second set of inputs 120A–128A, both for receiving D.C. voltage. TE 10A–18A have two opposite base plates: first base plated (i.e.—sides) 30A–38A and second base plates (i.e.—sides) 40A–48A. Supplying a voltage difference between a first input and second input of one of TE 10A–18A results in an electrical current which passes through that TE and causes a reduction of temperature on TE first (i.e.—cold side) 40A–48A and an increase of temperature on TE second side (i.e.—hot side) 30A–38A. Some of the first and second sets of inputs 20A–28A and 120A–128A can be connected in parallel to the voltage supply, and some of the first and second sets of inputs 20A–28A and 120A–128A can be connected in series. Preferably, the first set of inputs 20A–28A and the second set of inputs 120A–128A are connected in parallel to the power supply. Those who are skilled in the art will understand that reversing the polarity of the D.C. voltage inputted to first set of inputs 20A–28A and second set of inputs 120A–128A causes first sides 30A–38A to become cold and second sides 40A–48A to become hot. For convenience, the hot side of TE 10A–18A are denoted as 30A–38A and the cold side of TE 10A–18A are denoted as 40A–48A.

Two heat exchangers 50A, 60A, having bases 52A, 62A respectively. Base 52A of the first heat exchanger 50A is thermally coupled to sides 30A–38A of TE 10A–18A. For convenience, the first heat exchanger 50A is referred to as the hot heat exchanger 50A. Base 62A of the second heat exchanger 60A is thermally coupled to sides 40A–48A of TE 10A–18A. For convenience, the second heat exchanger 60A is referred to as the cold heat exchanger 60A. Conveniently, cold sides 40A–48A of TE 10A–18A are connected to spacers, made of thermal conductive material. The spacers have two sides, wherein one side is connected to the cold sides 40A–48A and the other side is connected to base 62A of second heat exchanger. The space between the TE 10A–18A, the base 62A of the second heat exchanger 60A and the base 52A of the first heat exchanger 50A are filled with a thermal insulating material. TE 10A–1A8 remain thermally coupled to first and second heat exchangers 50A and 60A.

A plurality of spaced projections 54A, are projected from base 52A and are integrally formed with said base 52A. Preferably, the spaced projections 54A are shaped like plain fins or pin fins, which are orthogonal to base 52A. A plurality of spaced projections 64A, are projected from base 64A and are integrally formed with said base 62A. Preferably, the spaced projections 64A are shaped like plain fins or pin fins, which are orthogonal to base 62A.

Housing 80A, surrounding the TE 10A–18A, the cold heat exchanger 60A, has at least one air inlet and at least one air outlet. For convenience of explanation, and without limiting the scope of the invention, housing 80A is regarded as having two fluid (i.e.—air) inlets—an inlet for directing fluid (i.e.—air) over the hot heat exchanger (i.e.—hot fluid inlet) 82A, and an inlet for directing fluid (i.e.—air) over the cold heat exchanger (i.e.—cold fluid inlet 86A), and having two fluid (i.e.—air) air outlets—a hot fluid outlet 84A and a cold fluid outlet 88A. Both fluid (i.e.—air) inlets 82A and 86A, are used to input fluid and conveniently ambient air into TACA 100A. At least a part of hot heat exchanger 50A, is within housing 80A. Housing 80A outer surface is made of thermal insulating material. Conveniently, the inner part of housing 80A, which surrounds the cold heat exchanger 60A is made of a heat conductive material.

First fluid (i.e.—air) circulation unit 70A, sucks fluid by means of a first fan, pump or blower 72A, and forces the fluid to flow, through hot air inlet 82A of housing 80A, over the spaced projections 54A of the hot heat exchanger 50A, thus undergoing an increase of temperature before being forced through hot air outlet 84A. For convenience, said air flow is refereed to as hot air stream 120A. First air circulation unit 70A can also have a first filter 74A, placed between housing 80A hot air inlet 82A and the first fan, pump or blower 72A, for removing dirt particles in the sucked ambient air.

Second fluid.(i.e.—air) circulation unit 76A, sucks ambient air by means of a second fan, pump or blower 78A, and forces the air to flow, through cold air inlet 86A of housing 80A and over the spaced projections 64A of the cold heat exchanger 60A, thus undergoing a reduction of temperature before being forced through cold air outlet 88A of housing 80A. For convenience, said air flow is referred to as cold air stream 126A. Second air circulation unit 76A can also have a second filter 78A, placed between housing 80A cold air inlet 86A and the second fan, pump or blower 78A, for removing dirt particles in the sucked ambient air.

Housing 80A can have a single fluid (i.e.—air) inlet (not shown in FIG. 1A), wherein the air which flows through the single air inlet is split. The air can be forced through TACA 100A by a single air circulation unit (not shown in FIG. 1A).

Figure 10A:
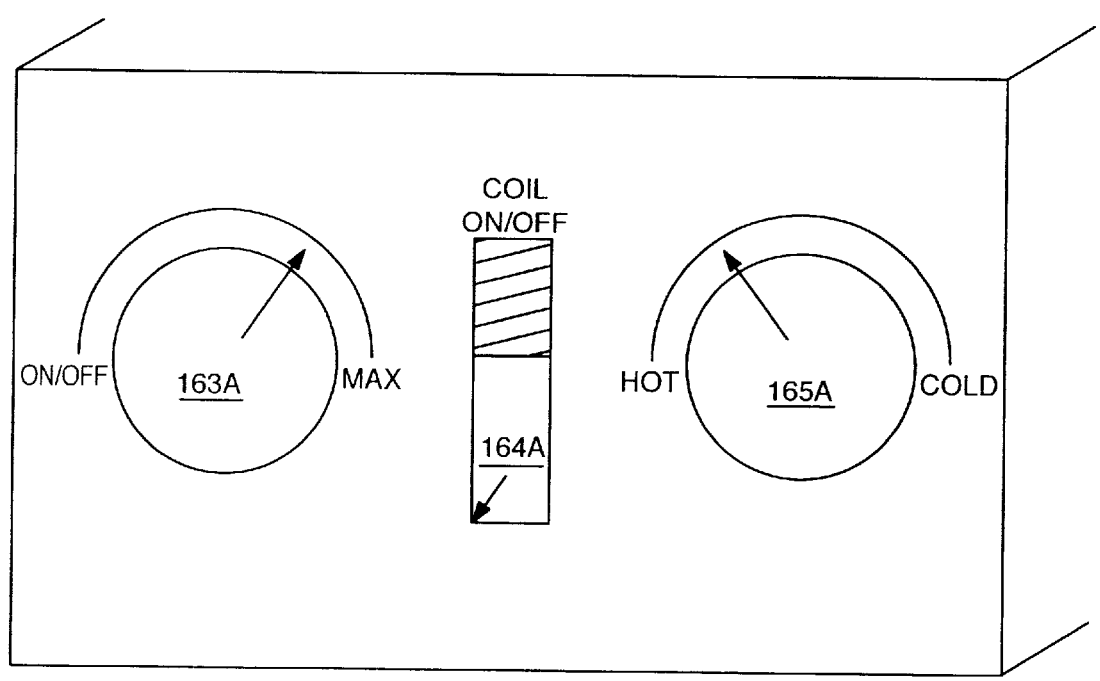
FIG. 10A is a detailed description of the control unit panel, according to a preferred embodiment of the invention.

A control unit (not shown in FIG. 1A, but an analogues control unit, denoted as 160A is shown in FIG. 10A), has a TE control output, and an on/off switch. The control unit controls the voltage and current supply to inputs 20A–28A of TE 10A–18A. The control unit can also be used to reverse the polarity of the voltage and current supplied to the thermoelectric elements.

TACA 100A is preferably connected to a body suit of jacket, worn by a motorcyclist. The body suit or jacket, the mounting of TACA 100A on the motorcycle are explained in further details in reference to FIGS. 11A–12A. If the motorcyclist wants to warm himself he can connect the hot air outlet 84A of housing 80A to his body suit or jacket or to a helmet. If the motorcyclist wants to cool himself he can connect the cold air outlet 88A of housing 80 to his body suit or jacket and to a helmet. The motorcyclist can also connect one out of the two outlets 88A and 84A, and reverse the polarity of the voltage and or current which are supplied to the thermoelectric elements.

In another preferred embodiment of the invention, main section 102A is coupled to a temperature regulator 90A or 190A. Temperature regulator 90A is described in further details in FIGS. 3A–5A and temperature regulator 190A is described in further details in FIGS. 6A–8A. Temperature regulator 90A (190A) has two inlets 92A and 94A which are connected to the two outlets 84A and 88 of housing 80A. Temperature regulator 90A (190A) controls the temperature of the air which exits it. The temperature regulator 90A (190A) is controlled by a control unit, as explained in further details when relating to FIG. 3A–5A and 6A–8A.

FIGS. 3A–5A are a top view, a side view and a front view respectively of temperature regulator 90A, according to a preferred embodiment of the invention.

Temperature regulator 90A is comprised of three parts 112A, 114A and 116A, preferably of rectangular shape, a base 118A, a sheave 121A and a servo motor 110A. Base 118A is connected to lower sides of all three parts 112A, 114A and 116A. First part 112A has a first air inlet 92A and a second air inlet 94A. Second part 114A preferably has a first air exhaust outlet 98A and a second exhaust outlet 100A. Second part 114A conveniently has one exhaust outlet 99A (not shown in FIGS. 3A–5A), instead of first and second air exhaust outlets 98A, 100A.

Third part 116A has a main air outlet 96A and a piston 111A which travels in the space confined by the first part 112A, the second part 114A and the base. Piston 111A can various shapes, according to the space confined by the first and second parts 112A and 114A of temperature regulator 90A, in which piston 111A can travel. Piston 111A has an ability to travel perpendicular to the first air inlet 92A, the second air inlet 94A, the first air exhaust outlet 98A and to the second air exhaust outlet 100A. Piston 111A has 3 cavities. First cavity 113A allows the flow of air from the first air inlet 92A to the first air exhaust outlet 98A. Second cavity 115A allows the air flow from the first and second air inlet 92A and 94A to the main exhaust outlet 96A. Third cavity 117A allows the flow of air from the second air inlet 94A to the second air exhaust outlet 10A. Second cavity 115A preferably is larger then first cavity 113A and third cavity 117A.

Piston 111A is connected to a sheave 121A. Sheave 121A is preferably connected to a servo engine 110A. Servo engine has control inputs 123A, for receiving control signals from control unit 130A. Control unit 130A sends the servo engine 123A control signals which causes the sheave, and the piston to travel in the space confined by the first and second parts 112A and 114A of temperature regulator 90A.

In another embodiment of the invention, sheave 121A is connected to a lever (not shown in FIGS. 3A–5A and 6A–8A) and not to servo engine 123A. The lever can be moved manually.

The first, second and third cavity 113A, 115A and 117A fully overlap the first air inlet 92A and the second air inlet 94A, so that the air that flows through the first and second air inlets 92A and 94A flows through one of more of the three cavities 113A, 115A. and 117A, and through the main air outlet 96A and a least one of the first and second air exhaust outlets 98A and 100A.

The temperature of the air leaving the main air outlet 96A is determined by proportioning the flow of air from the first air inlet 92A and the second air inlet 94A into and through the main air outlet 96A. The proportioning is done by moving piston 111A in a way which changes the relative overlapping between the second cavity 115A and the first and second air inlets 92A and 94A. For example, if the air condition apparatus user needs a flow of cold air, the piston 111A is moved so that the second cavity 115A will overlap just the second air inlet 94A so that the cold air flow 126A flows from the second air inlet, through the second cavity 115A and to the main air outlet 96A. The hot air flow 120A flows from the first air inlet 92A, through the first cavity 113A to the first air exhaust outlet 98A. If, for example, the air condition apparatus user needs a warmer air flow, the piston 111A is moved so that the second cavity 115A will also partly overlap the first air inlet 92A.

Those who are skilled in the art will appreciate that temperature regulator 90A can have an auxiliary exhaust outlet 99A (not shown in FIGS. 3A–5A and 6A–8A), instead of first and second air exhaust outlets 98A, 100A. Second cavity 115A allows the air flow from the first and second air inlet 92A and 94A to the main exhaust outlet 96A.

In a further embodiment of the invention, the second exhaust outlet 100A of temperature regulator 90A is connected to a second insulating hose 170A, having a smaller cross section then hot air inlet 82A. Second insulating hose 170A is connected to hot air inlet 82A, so that both cooled air from hose 170A and ambient air are sucked by first air circulating unit 70A, amounting in an improved heat discharge of hot air exchanger 50A.

FIGS. 6A–8A are a top view, a side view and a front view of temperature regulator 190A, according to another preferred embodiment of the invention. Temperature regulator 190A is analogous to temperature regulator 90A except for the following changes:

Second part 114'A has the main exhaust outlet 96'A of temperature regulator 190A.

Third part 116'A has the first and second exhaust outlets 98'A and 100'A.

Piston 111'A of temperature regulator 190A has just one cavity 115'A, analogous to second cavity 115A of temperature regulator 90A. Cavity 115'A allows the air flow from the first and second air inlets 92'A and 94'A to the main exhaust outlet 96'A. Piston 111'A of FIGS. 6A–8A can be shorter than piston 111A of FIGS. 3A–5A, allowing exhausted air (i.e.—the air which does not flow through main exhaust outlet 96'A) to flow through a space confined by piston 111'A first part 112'A, second part 114'A and base 118'A.

Figure 9A:
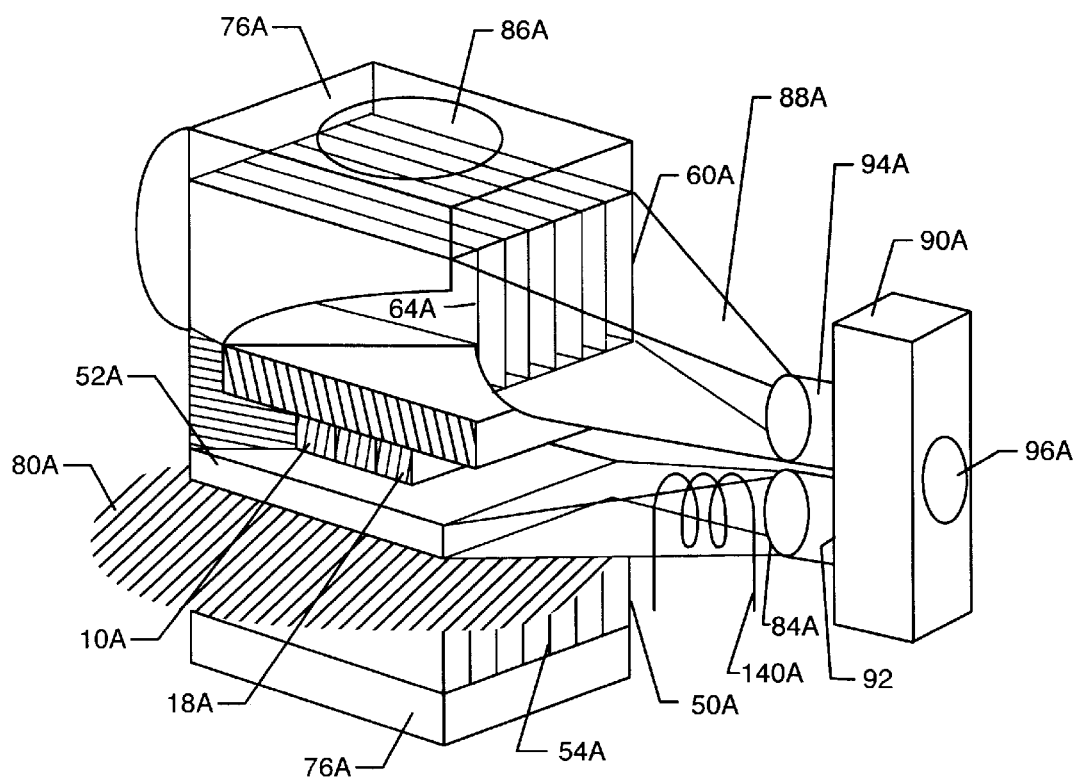
FIG. 9A is a perspective view of the main section of a thermoelectric air-condition apparatus, according to another preferred embodiment of the invention.

FIG. 9A is a perspective view of the main section 102'A of a thermoelectric air condition apparatus (i.e.—TACA) 100"A, according to another preferred embodiment of the invention. Main section 102'A can be connected to a temperature regulator 90A (190A), and to a control unit 160A, shown in FIG. 10A. Section 102'A is analogues to main section 102A shown in FIGS. 1A–2A, but has an additional heating element 140A.

Heating element 140A, is installed within housing 80A. Heating element 140A is preferably placed between the hot air exchanger 50A and the hot air outlet 84A, but it can also be placed in other locations within housing 80A. Preferably, most or all of heating element 140A is located within the path of the hot air flow 120A. More conveniently, heating element 140A has a spiral shape, wherein its main axis is parallel to the path of hot air flow 120A.

Heating element 140A has two inputs, wherein supplying electromagnetic energy to the heating element causes it to radiate heat.

Preferably, heating element 140A is activated instead of TE 10A–18A. First air circulation unit 70A, sucks ambient air by means of a first fan or a blower 72A, and forces the air to flow, through housing hot air inlet 82A, over the spaced projections 54A of the hot heat exchanger 50A, and over heating element 140A, thus undergoing an increase of temperature before being flown through hot air outlet 84A of housing 80A to a first air inlet 92A of temperature regulator 90A. Second air circulation unit 76A, sucks ambient air by means of a second fan or a blower 78A, and forces the air to flow, through housing 80A cold air inlet 86A, over the spaced projections 64A of the cold heat exchanger 60A through cold air outlet 88A of housing 80A, to a second air inlet 94A of temperature regulator 90A. Because TE 10A–18A are not activated this air stream does not undergo a reduction of temperature within TACA 100A.

Control unit 160A activates heating element 140A, and preferably does not activate TE 10A–18A. A stream of ambient air will flow to the second air inlet 92A of the temperature regulator 90A and a stream of ambient air will flow over the heating element 140A and into the first air inlet 94A of the temperature regulator 90A.

FIG. 10A is a detailed description of the control unit 160A panel 162A, according to a preferred embodiment of the invention. Panel 162A preferably has a rectangular shape. Panel 162A has a first control knob 163A for activating TACA 100A and for controlling the strength of the air flow, and the intensity of cooling and heating done by TE 10A–18A or the heating element, a first switch 164A for determining whether to activate the heating element 140A or TE 10A–18A and a second control knob 165 for controlling temperature regulator 90A and consequently determining the temperature of the air flow flowing out of the main air outlet 92A. Control 130A panel 132A (not shown in FIG. 10A) is analogues to control unit 160A, but without the first switch 164A.

First control knob 163A conveniently controls the level of D.C. voltage arriving to TE 10A–18A inputs 20A–28A and 120A–128A, and to fan or blowers 72A,78A and to heating element 140A. Preferably, the first control knob 163A also activates or deactivates the TACA 100A. The D.C. voltage level can be changed by rotating the first control knob 163A. The second control knob 165A controls the servo motor 110A. If a lever replaces the servo motor 110A, there is no need of the second control knob 165A. The control unit 160A can also have a knob for reversing the polarity of the voltage and/or current supplied to the thermoelectric elements.

Those who are skilled in the art will appreciate that the control unit circuitry is simple, well known, and can be implemented in many ways. For example, the first control knob 163A can control an analog circuit having an output voltage which is proportional to the control signal arriving from first control knob 163A. Said analog circuit can be a potentiometer.

In another embodiment of the invention, the control unit 160A includes additional control knobs (not shown in FIG. 10A), which allow to control the level of D.C. voltage arriving to each of the following elements: TE 10A–18A, first fan or blower 72A, second fan or blower 78A, heating element 140A.

Figure 11A:
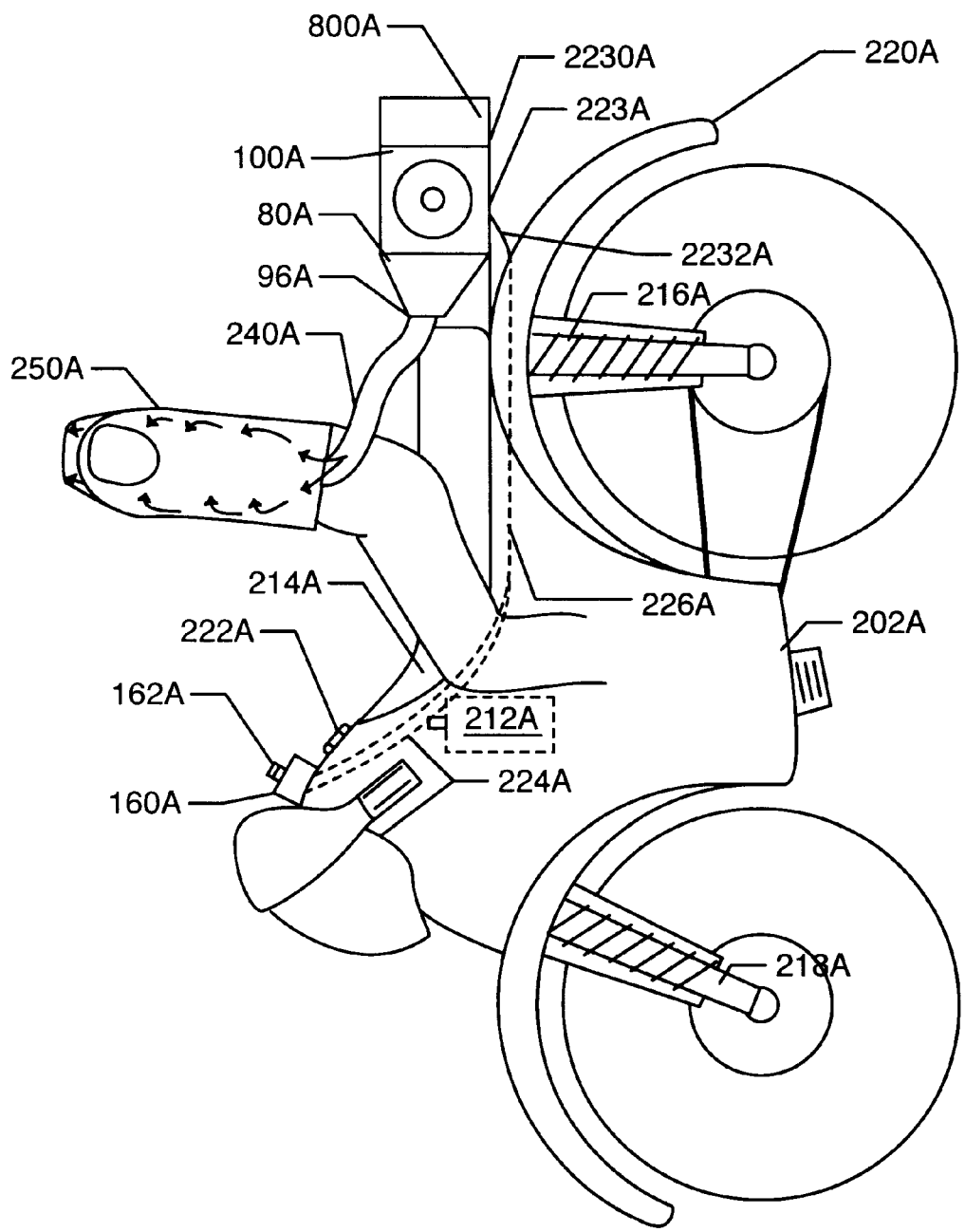
FIG. 11A is a side view of the apparatus in use on a motorcyclist.

FIG. 11A is a side view of TACA 100'A mounted on a motorcycle 202A, according to a preferred embodiment of the invention. Those who are skilled in the art will appreciate that TACA 100A and TACA 100"A are mounted in the same manner as TACA 100'A. Motorcycle 202A has a handlebar 210A, a battery 212A, a seat 214A, a rear shock absorber 216A, a frame 218A, a rear fender 220A a fuel tank 222A and an adapter++223A. Control unit 160A can be connected to the motorcycle 202A, or can be placed within a pocket of a body suit. Control unit 160A is conveniently connected to motorcycle 202A in a manner that allows the motorcyclist to access the control unit 160A, while driving motorcycle 202A. Preferably, control unit 160A is connected to handlebar 210A, so that the control unit panel 162A faces the motorcyclist. The control unit can be connected to handlebar 210A by two pairs of clumps, wherein each pair of clumps surrounds handlebar 210A. Control unit 160A and housing 80A can be mounted to motorcycle 202A in a detachable manner.

For convenience of explanation, and without limiting the invention, it is assumed that temperature regulator 190A (or 90A) is within housing 80A, and that housing 80A has a base 800A.

Control unit 160A (or 130A) is coupled, by wires 224A, to battery 212A which supplies control unit 160A, and accordingly TACA 100'A a supply voltage. Control unit 160A is coupled to main section of TACA 100'A by conductive wires 226A. Conveniently, wires 222A are connected to motorcycle frame 218A. Preferably, wires 224A are connected to various parts of motorcycle 202A, which are located below fuel tank 222A.

An adapter 223A has an upper plate 2230A, connected to base 800A of housing and a lower plate 2232A, connected to motorcycle 202A. Conveniently, lower plate 2232A is connected to motorcycle 202A behind seat 214A. Lower plate 2232A can be connected to rear fender 220A or to frame 218A. Preferably, lower plate is connected above rear shock absorber 216A. Upper plate 2230A can be connected to housing 80A by a plurality of bolts and nuts, wherein the plurality of bolts are inserted into a plurality of holes made in housing 80A and a plurality of corresponding holes made in upper plate 2230A. Lower plate 2232A is connected to motorcycle 202A at the same manner.

Those who are skilled in the art will appreciate that due the compact size of TACA 100A, it can be placed within a variety of places, such as, but not limited to motorcycle backpacks or luggage racks.

Figure 12A:
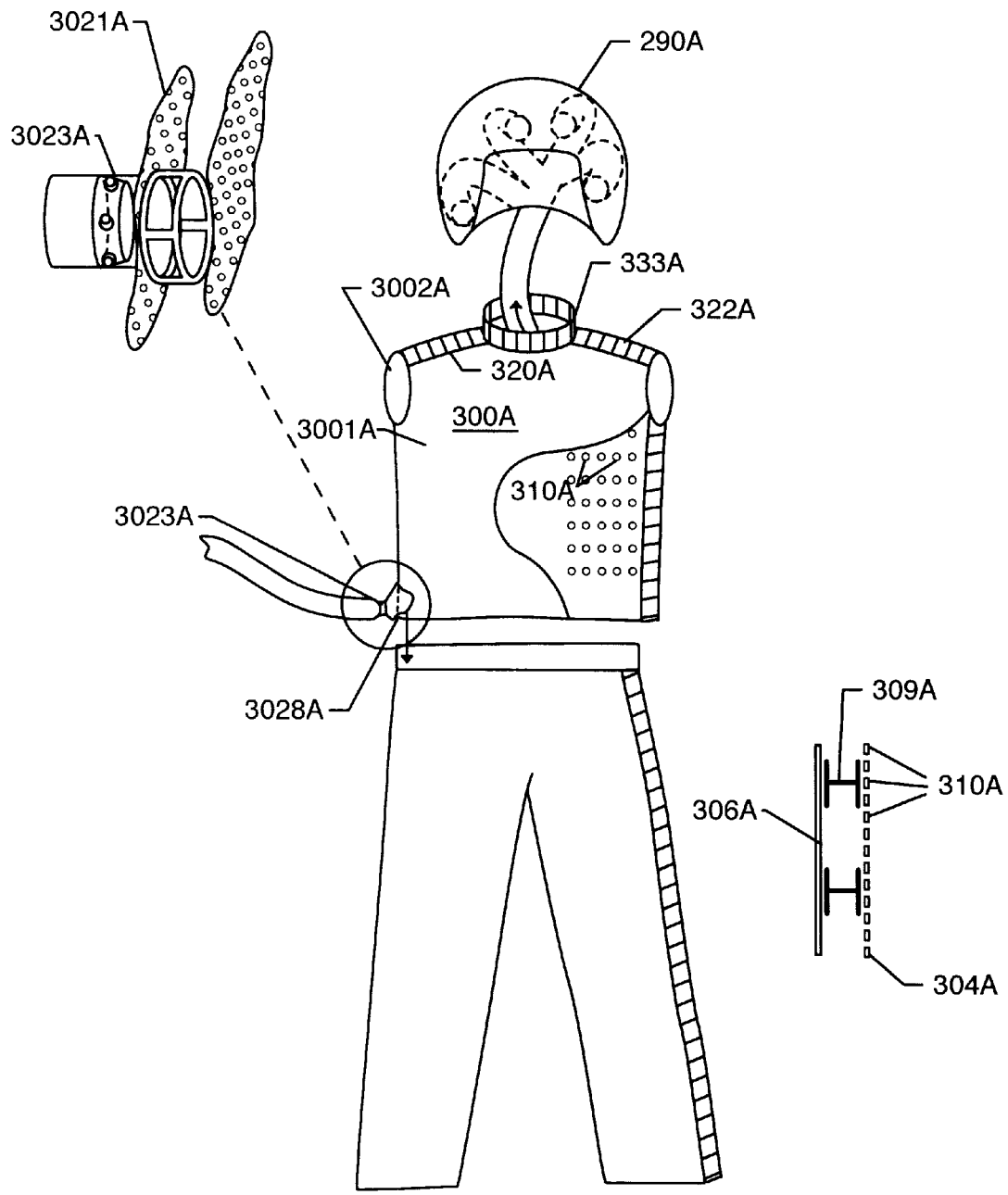
FIG. 12A is a front cross-sectional view of the apparatus.

Main air outlet 96A of housing 80A can be connected to a hose 240A, which is connected to a body suit 250A or to helmet (not shown in FIG. 11A, but denoted as 290A in FIG. 12A). Preferably, the main air outlet 96A, the hose 240A, the body suit 250A and the helmet 260A are connected by quick connectors, for allowing to connect and disconnect these elements in a swift manner.

Conveniently, body suit 250A can be one of a variety of suits used to cool or heat the person who wears them. Preferably, body suit 250A is the body suit which is described in FIG. 12A.

In another preferred embodiment of the invention, the main air outlet 96A is connected to body suit 300A and a helmet (not shown in FIG. 11A but denoted 290A in FIG. 12A). The main air outlet can be coupled to a distributor 260A (not shown in FIG. 6A). Distributor 260A has one input 262A and two outputs 264A and 266A. Input 262A is connected to main air outlet 96A. First output 264A is connected to a first hose 270A, and second output 266A is connected to a second hose 272A. The first hose is connected to body suit 300A and the second hose is connected to helmet 290A. Those who are skilled in the art will appreciate the main air outlet can be connected to a hose, wherein the hose is connected to body suit 300A. And that body suit has another air outlet, which is connected, by another hose to helmet 290A.

If TACA 100A is mounted to motorcycle 202A, and the motorcyclist wants to cool himself, he connects the cold air outlet 88A of housing 80A to body suit 300A and to helmet 290A. When the motorcyclist wants to warm himself he connects the hot air outlet 84A of housing to body suit 300A and to helmet 290A. In another preferred embodiment of the invention, the motorcyclist can also connect one out of the two outlets 88A and 84A, to his body suit and use the control unit 160A to reverse the polarity of the voltage and or current which are supplied to the thermoelectric elements.

FIG. 12A is a cross sectional view of a body suit 300A coupled to an thermoelectric air condition apparatus 100A (100'A, 100"A), according to a preferred embodiment of the invention.

Body suit 300A has a front 3001A and a back 3002A. Preferably, body suit 300A comprises of at least one air conditioning hose attachment 302A, an inner layer (i.e. first layer) 304A, and an outer layer (i.e. second layer) 306A.

A plurality of-flexible spacers (collectively denoted as 309A) can be used to separate the first layer 304A from the second layer 306A and allow air to flow through a space confined by the spacers and the layers. Each of the spacers has preferably a "I" shaped or a "H" shaped cross section. Conveniently, some of the spacers are interconnected. Some of the spacers are preferably connected to the first and second parts 304A and 306A of the suit 300A, but they can be connected to the first and second parts 304A and 306A in various different ways.

The first layer 304A has a large number of holes 310A, arranged in a plurality of arrays. The air which enters the body suit, through air conditioning hose attachment 302A, flows through the space confined by the first and second layers 302A and 302A and exits the body suit 300A through the holes 310A.

Conveniently, body suit 300A has at least one array of holes out of the following arrays (not shown in FIG. 12A): a first array of holes is located in the upper part of front 3001A, for allowing air to flow over the chest of the suit wearer. A second array of holes is located in the upper part of back, for allowing air to flow over the back of the wearer of the suit. A third and a fourth arrays of holes and can be located in the suits sleeves; for allowing air to flow over the armpits of the wearer of the suit. A fifth and sixth arrays of holes and can be located in the lower parts of the front and the back 3001A and 3002A, for allowing air to flow over the abdomen and the lower back of the wearer of the suits. Preferably body suit 300A has a collar 333A. Collar 333A has a plurality of holes which allow air to flow over the motorcyclist neck and nape. Preferably, the holes are placed in a manner which allows the cooling and/or heating of a motorcyclist arm pits and torso.

Conveniently, front 3001A has a plurality of attachment surfaces (i.e. front attachment) 320A and back 3002A has a plurality of a corresponding attachment surface (i.e.—back attachments) 322A. The front and back attachments 320A and 322A are used to restrain back 3001A and front 3002A together. The front and back attachments 320A and 322A are also used to adjust the body suit 300A to the motorcyclist and can also allow the motorcyclist to take the suit off in a relatively quick manner. The front attachment 320A can be made of a plurality of hooks and the back attachment 322A can be made of a plurality of corresponding loops. When the front attachment 320A and the back attachment are pressed together the hooks are caught in the loops.

TACA 100A can also be connected to a helmet 290A, having an inlet connector and an array of cavities for permitting air flown from TACA 100A to various locations within the helmet.

Conveniently, body suit 300A has a hose attachment 302A, for connecting body suit 300A to hose 240A. Connector 302A has three parts—a first part 3021A which is used to connect the connector to the second layer 306A of the body suit 300A, a second part 3022A, placed between first and second layers 304A and 306A, and a third part 2953A which is partly surrounded by the first part 3022A, for connecting a hose to the body suit. The second part 3022A is preferably made of a flexible material. Preferably, the second part 3022A is made of two parallel rings, which are connected by a plurality of perpendicular ribs. Conveniently the third part 3023A has a cylindrical shape.

In another preferred embodiment of the invention, TACA 100A (100'A or 100"A) outputs cooled or heated fluid into body suit 300A. Body suit 300A has two hose attachments—one for receiving fluid from TACA 100A (100'A, 100"A) and a second for exiting the fluid. The first layer 304A has no holes, and fluid flows from one hose attachment, through the space confined by first and second layers 304A and 306A and spacers, to the second hose attachment.

The invention includes an apparatus for air-conditioning a motorcyclist comprising of: a housing having two flow inlets and two flow outlets; a plurality of thermoelectric elements, within the housing, each having a first base and a second base, in which an application of an electrical current causes a reduction of temperature in the first base and an increase of temperature on the second base; a first heat exchanger, having a base plate connected to the first bases of the plurality of thermoelectric elements; wherein at least a part of the first heat exchanger is within the housing; a second heat exchanger, within the housing, having a base plate connected to the second bases of the plurality of thermoelectric elements; a first fluid circulation unit, within the housing, for forcing fluid to flow through a first fluid inlet of the housing, over the first heat exchanger and to the first fluid outlet of the housing; a second fluid circulation unit, within the housing, for forcing fluid to flow through a second fluid inlet of the housing, over the second heat exchanger and to the second fluid outlet of the housing; and wherein the housing is mounted on a motorcycle.

In the apparatus described in the preceding paragraph, the housing may be connected to an adapter; and wherein the adapter may be connected to the motorcycle. In the apparatus described in the preceding paragraph, the housing may be placed within or on a back rack; and wherein the back rack may be connected to the motorcycle. The apparatus described in the preceding paragraph may further comprise a control unit; wherein the control unit activates the thermoelectric elements, the first and the second fluid circulation units. The control unit may control the polarity of the voltage supply to the thermoelectric elements. In the apparatus described in the preceding paragraph, one of the outlets of the housing may be coupled to a body suit worn by a motorcyclist. In the apparatus described in the preceding paragraph, one of the outlets of the housing may be coupled to a helmet worn by a motorcyclist. The apparatus described in the preceding paragraph may further comprise a temperature regulator, having a first and a second fluid inlets, a main fluid outlet and an fluid exhaust outlet, the temperature regulator for controlling the temperature of the fluid which flows through the main fluid outlet; wherein the first fluid circulation can force fluid to flow through the first fluid inlet of the housing, over the first heat exchanger and to the first fluid inlet of the temperature regulator; wherein the second fluid circulation unit can force fluid to flow through the second fluid inlet of the housing, over the second heat exchanger and to the second fluid inlet of the temperature regulator; and wherein the temperature of the fluid leaving the main fluid outlet of the temperature regulator is determined by proportioning the flow of fluid from the first fluid inlet of the temperature regulator and the fluid flow from the second fluid inlet of the temperature regulator into and through the main fluid outlet of the temperature regulator. The main fluid outlet of the temperature regulator may be coupled to a body suit worn by a motorcyclist. The main fluid outlet of the temperature regulator may be coupled to a helmet worn by a motorcyclist. The temperature regulator may comprise: a piston, having a single cavity, wherein the single cavity allows the fluid flow from the first and second fluid inlets of the temperature regulator to the main fluid outlet: wherein the temperature of the fluid leaving the main fluid outlet of the temperature regulator is determined by moving the piston in a way which changes the relative overlapping between the single cavity and the first and second fluid inlets of the temperature regulator; and wherein the fluid flowing from the first and second fluid inlets of the temperature regulator, which does not flow through the single cavity, is exhausted through a space confined by the piston, the first and second parts of the temperature regulator and the temperature regulator base. The temperature regulator may further comprise: a sheave, connected to the piston; a servo engine, having control inputs coupled to the control unit, wherein servo engine is connected to the sheave, for moving the piston; and wherein the control unit sends the servo engine control signals which causes the sheave, and the piston to travel in the space confined by the first and second parts of temperature regulator. In the apparatus described in the preceding paragraph, a heating element may be installed within the housing; wherein, supplying electromagnetic energy to the heating element causes the heating element to radiate heat: and wherein the apparatus can be used to warm fluid by activating the heating element instead of the thermoelectric elements. The control unit may have a panel with two knobs and a switch; wherein the first knob controls the strength of the fluid flow, flowing out of the temperature regulator main fluid outlet and for controlling the intensity of cooling and heating done by the thermoelectric elements or the heating element; wherein the switch determines whether to activate the thermoelectric elements of the heating elements; and wherein the second knob determines the temperature of the fluid flow, flowing out of the temperature regulator main fluid outlet. The apparatus described in the preceding paragraph may further comprise a plurality of spacers; wherein the spacers are made of heat conductive material; wherein the spacers have two side plates; wherein the first sides of the thermoelectric elements are connected to the first plate side of the spacers; wherein the second plate side of each spacer is connected to the base of the second heat exchangers; and wherein, space between the thermoelectric elements, the spacers, the bases of the first and second heat exchange units is filled with a thermal insulating material. In the apparatus described in the preceding paragraph, the housing may have a single fluid inlet, wherein the fluid which flows through the single fluid inlet is sucked by an single fluid circulation unit and then split into two parts; wherein a first part flows over the first heat exchanger; and wherein the second part flows over the second heat exchanger. The body suit may comprise: a first layer; a second layer, having a plurality of holes; an air condition hose attachment, connected to one of the outlets of the housing; and wherein air flows from the air condition hose attachment, between the first and the second layers, and exits the body suit through the plurality of holes. The body suit may further comprise a plurality of flexible spacers, for separating the first layer from the second layer; and wherein air flows from the fluid condition hose attachment through a space confined by the first and second layer and the flexible spacers and exits the body suit through the large number of holes within the second layer. The body suit may comprise: a first layer; a second layer having a plurality of holes; an fluid condition hose attachment, connected to one of the outlets of the housing; and wherein air flows from the fluid condition hose attachment between the first and the second layers, and exits the body suit through the plurality of holes. The holes may be arranged in a plurality of arrays. The suit may have a collar, wherein the collar has a plurality of holes, for allowing fluid to flow over the neck and nape of a motorcyclist. The body suit comprising may comprise a front and a back; wherein the front is connected to a plurality of attachment surfaces; wherein the back is connected to a plurality of a corresponding attachment surface; and wherein the attachment surfaces and the corresponding attachment surfaces are used to restrain the back and the front together, and to adjust the suit to its wearer.

The invention also includes a thermoelectric fluid conditioning apparatus for a motorcyclist comprising a housing having a plurality of fluid inlets and fluid outlets; a plurality of thermoelectric elements and two heat exchangers. The apparatus can also have a temperature regulator, having first and second fluid inlets, a main fluid outlet and at least one fluid exhaust outlet; at least one fluid circulation unit and a control unit. The unit is mounted on a motorcycle, and is preferable connected to a bodysuit and/or a helmet worn by the motorcyclist. The thermoelectric elements are energized an cause a reduction of temperature on one side and an increase of temperature on the other side of the thermoelectric element. One fluid flow is forced to flow through a hot heat exchanger and to the first fluid outlet of the housing. Another fluid is forced to flow through the cold heat exchanger.

What is claimed is:

1. A thermoelectric air-conditioning apparatus, comprising:
    a housing having a plurality of fluid inlet and a plurality of fluid outlets;
    a plurality of thermoelectric elements within the housing, each having a first base and a second base, in which an application of an electrical current causes a reduction of temperature in the first base and an increase of temperature in the second base;
    a first heat exchanger having a base plate connected to the first base plates of the plurality of thermoelectric elements, wherein at least a part of the first heat exchanger is within the housing;
    a second heat exchanger within the housing, having a base plate connected to the second base plates of the plurality of thermoelectric elements;
    a temperature regulator, having a first and second fluid inlets, a main fluid outlet and at least one fluid exhaust outlet, for regulating the temperature of the fluid flow outputted through its main fluid outlet;
    a first fluid circulation unit within the housing, for forcing fluid to flow through one of a plurality of the housing fluid inlets over the first heat exchanger and to the first fluid inlet of the temperature regulator;
    a second fluid circulation unit within the housing, for forcing fluid to flow through one of the plurality of the housing fluid inlets over the second heat exchanger and to the second fluid inlet of the temperature regulator;
    a control unit coupled to the temperature regulator, for controlling the temperature of the fluid flow through the main fluid outlet of the temperature regulator, wherein the temperature of the fluid leaving the main fluid outlet of the temperature regulator is determined by proportioning the flow of fluid from the first fluid inlet of the temperature regulator and the fluid flow from the second fluid inlet of the temperature regulator into and through the main fluid outlet of the temperature regulator,
    said temperature regulator including:
        a base;
        a first part, having a first fluid inlet and a second fluid inlet;
        a second part, having a plurality of fluid exhaust outlets;
        a third part, having a main fluid outlet and a piston;
        wherein the piston travels in the space confined by the base, the first part and the second part;
        wherein, the piston has three cavities;
        wherein the first cavity allows the flow of fluid from the first fluid inlet of the temperature regulator to one of the plurality of fluid exhaust outlet of the temperature regulator;
        wherein the second cavity allow the fluid flow from the first and second fluid inlets of the temperature regulator to the main fluid outlet;
        wherein the third cavity allows the flow of fluid from the second fluid inlet of the temperature regulator to one of the plurality of fluid exhaust outlet of the temperature regulator;
        wherein the piston can travel in the space confined by the first and second parts of temperature regulator;
        wherein the first, second and third cavity overlap the first fluid inlet and the second fluid inlet of the temperature regulator, so that the fluid that flows through the first and second fluid inlets of the temperature regulator flows through one or more of the three cavities and through the main fluid outlet and at least one of the plurality of exhaust outlets of the temperature regulator; and
        wherein the temperature of the fluid leaving the main fluid outlet of the temperature regulator is determined by moving the piston in a way which changes the relative overlapping between the second cavity and the first and second fluid inlets of the temperature regulator.

2. The apparatus of claim 1, further comprising a plurality of spacers;
    wherein in the spacers are made of heat conductive material;
    wherein the spacers have two side plates;
    wherein the first sides of the thermoelectric elements are connected to the first plate side of the spacers;

wherein the second plate side of each spacer is connected to the base of the second heat exchangers;

wherein, space between the thermoelectric elements, the spacers, the bases of the first and second heat exchange units is filled with a heat insulating material.

3. The apparatus of claim 1, wherein the housing has a single fluid inlet, wherein the fluid which flows through the single fluid inlet is sucked by a fluid circulation unit and then split into two parts;

wherein a first part of the fluid flow flows over the first heat exchanger; and wherein the other part of the fluid flows over the second heat exchanger.

4. The apparatus of claim 1, wherein the apparatus is mounted on a motorcycle; and wherein the apparatus is coupled to a body suit, worn by a motorcyclist.

5. A thermoelectric air-conditioning apparatus, comprising:

a housing having a plurality of fluid inlet and a plurality of fluid outlets;

a plurality of thermoelectric elements within the housing, each having a first base and a second base, in which an application of an electrical current causes a reduction of temperature in the first base and an increase of temperature in the second base;

a first heat exchanger having a base plate connected to the first base plates of the plurality of thermoelectric elements, wherein at least a part of the first heat exchanger is within the housing;

a second heat exchanger within the housing, having a base plate connected to the second base plates of the plurality of thermoelectric elements;

a temperature regulator, having a first and second fluid inlets, a main fluid outlet and at least one fluid exhaust outlet, for regulating the temperature of the fluid flow outputted through its main fluid outlet;

a first fluid circulation unit within the housing, for forcing fluid to flow through one of a plurality of the housing fluid inlets over the first heat exchanger and to the first fluid inlet of the temperature regulator;

a second fluid circulation unit within the housing, for forcing fluid to flow through one of the plurality of the housing fluid inlets over the second heat exchanger and to the second fluid inlet of the temperature regulator;

a control unit coupled to the temperature regulator, for controlling the temperature of the fluid flow through the main fluid outlet of the temperature regulator, wherein the temperature of the fluid leaving the main fluid outlet of the temperature regulator is determined by proportioning the flow of fluid from the first fluid inlet of the temperature regulator and the fluid flow from the second fluid inlet of the temperature regulator into and through the main fluid outlet of the temperature regulator, said temperature regulator comprising:

a sheave connected to the piston;

a servo engine having control inputs coupled to the control unit, wherein said servo engine is connected to the sheave for moving the piston, and wherein the control unit sends the servo engine control signals which cause the sheave and the piston to travel in the space confined by the first and second parts of the temperature regulator.

6. A thermoelectric air-conditioning apparatus, comprising:

a housing having a plurality of fluid inlet and a plurality of outlets;

a plurality of thermoelectric elements within the housing, each having a first base and a second base, in which an application of an electrical current causes a reduction of temperature in the first base and increase of temperature in the second base;

a first heat exchanger having a base plate connected to the first base plates of the plurality of thermoelectric elements, wherein at least a part of the first heat exchanger is within the housing;

a second heat exchanger within the housing, having a base plate connected to the second base plates of the plurality of thermoelectric elements;

a temperature regulator, having a first and second fluid inlets, a main fluid outlet and at least one fluid exhaust outlet, for regulating the temperature of the fluid flow outputted through its main fluid outlet;

a first fluid circulation unit within the housing, for forcing fluid to flow through one of a plurality of the housing fluid inlets over the first heat exchanger and to the first fluid inlet of the temperature regulator;

a second fluid circulation unit within the housing, for forcing fluid to flow through one of the plurality of the housing fluid inlets over the second heat exchanger and to the second fluid inlet of the temperature regulator;

a control unit coupled to the temperature regulator, for controlling the temperature of the fluid flow through the main fluid outlet of the temperature regulator, wherein the temperature of the fluid leaving the main fluid outlet of the temperature regulator is determined by proportioning the flow of fluid from the first fluid inlet of the temperature regulator and the fluid flow from the second fluid inlet of the temperature regulator into and through the main fluid outlet of the temperature regulator, said temperature regulator comprises:

a piston having a single cavity, wherein the single cavity allows the fluid flow from the first and second fluid inlets of the temperature regulator to the main fluid outlet;

wherein the temperature of the fluid leaving the main fluid outlet of the temperature regulator is determined by moving the piston in a way which changes the relative overlapping between the single cavity and the first and second fluid inlets of the temperature regulator; and wherein the fluid flowing from the first and second fluid inlets of the temperature regulator, which does not flow through the single cavity, is exhausted through a space confined by the piston, the first and second parts of the temperature regulator and the temperature regulator base.

7. The apparatus of claim 6 wherein the temperature regulator further comprising of:

a sheave, connected to the piston;

a servo engine, having control inputs coupled to the control unit, wherein servo engine is connected to the sheave, for moving the piston;

wherein the control unit sends the servo engine control signals which causes the sheave, and the piston to travel in the space confined by the first and second parts of temperature regulator.

8. The apparatus of claim 6 wherein the temperature regulator further comprising of a lever, connected to the piston; and wherein moving the lever causes the piston to travel in the space confined by the first and second parts of temperature regulator.

9. A thermoelectric air–conditioning apparatus, comprising:

a housing having a plurality of fluid inlet and a plurality of fluid outlets;

a plurality of thermoelectric elements within the housing, each having a first base and a second base, in which an application of an electrical current causes a reduction of temperature in the first base and an increase of temperature in the second base;

a first heat exchanger having a base plate connected to the first base plates of the plurality of thermoelectric elements, wherein at least a part of the first heat exchanger is within the housing;

a second heat exchanger within the housing, having a base plate connected to the second base plates of the plurality of thermoelectric elements;

a temperature regulator, having a first and second fluid inlets, a main fluid outlet and at least one fluid exhaust outlet, for regulating the temperature of the fluid flow outputted through its main fluid outlet;

a first fluid circulation unit within the housing, for forcing fluid to flow through one of a plurality of the housing fluid inlets over the first heat exchanger and to the first fluid inlet of the temperature regulator;

a second fluid circulation unit within the housing, for forcing fluid to flow through one of the plurality of the housing fluid inlets over the second heat exchanger and to the second fluid inlet of the temperature regulator;

a control unit coupled to the temperature regulator, for controlling the temperature of the fluid flow through the main fluid outlet of the temperature regulator, wherein the temperature of the fluid leaving the main fluid outlet of the temperature regulator is determined by proportioning the flow of fluid from the first fluid inlet of the temperature regulator and the fluid flow from the second fluid inlet of the temperature regulator into and through the main fluid outlet of the temperature regulator, further comprising a heat element installed within the housing;

wherein most or all of the heating element being located within the path of the fluid flow that enters the first fluid outlet of the housing, wherein supplying electromagnetic energy to the heating element causes it to radiate heat; and wherein the apparatus is used to warm fluid by activating the heating element instead of the thermoelectric elements.

10. The apparatus of claim 9 wherein the heating element is placed between the first fluid inlet and the first fluid outlet of the housing; and wherein most or all of the heating element is located within the path of the fluid flow that enters the first fluid outlet of the housing.

11. The apparatus of claim 9 wherein the control unit has a panel with two knobs and a switch;

wherein the first knob controls the strength of the fluid flow, flowing out of the temperature regulator main fluid outlet and for controlling the intensity of cooling and heating done by the thermoelectric elements or the heating element;

wherein the switch determines whether to activate the thermoelectric elements or the heating elements; and wherein the second knob determines the temperature of the fluid flow, flowing out of the temperature regulator main fluid outlet.

12. The apparatus of claim 11 wherein the first knob controls the level of D.C. voltage inputted to the thermoelectric elements, the heating device and the first and second fluid circulation units; and wherein the second knob controls the movement of the piston.

13. The apparatus of claim 9 wherein the control unit can control the level of D.C. voltage inputted to each of the thermoelectric elements, the level of D.C. voltage arriving to the heating device and the level of D.C. voltage arriving to each of the two fluid circulation units.

14. An apparatus for air-conditioning a motorcyclist comprising:

a housing having at least one flow inlet and at least one flow outlet;

a plurality of thermoelectric elements within the housing, each having a first base and a second base, in which an application of an electrical current causes a reduction of temperature in the first base and an increase of temperature in the second base;

a first heat exchanger having a base plate connected to the first bases of the plurality of thermoelectric elements, wherein at least a part of the first heat exchanger is within the housing;

a second heat exchanger within the housing, having a base plate connected to the second bases of the plurality of thermoelectric elements;

a first fluid circulation unit within the housing, for forcing fluid to flow through a first fluid inlet of the housing, over the first heat exchanger and to the first fluid outlet of the housing;

a second fluid circulation unit within the housing, for forcing fluid to flow through a second fluid inlet of the housing, over the second heat exchanger and to the second fluid outlet of the housing;

wherein the housing is adapted to be mounted on a motorcycle;

wherein one of the outlets of the housing is coupled to a bodysuit;

wherein the body suit comprising:

a first layer;

a second layer having a plurality of holes;

an air condition hose attachment connected to one of the outlets of the housing; and wherein air flows from the air condition hose attachment, between the first and second layers, and exits the body suit through the plurality of holes.

15. The apparatus of claim 14 wherein the housing is connected to an adapter; and wherein the adapter is connected to the motorcycle.

16. The apparatus of claim 14 wherein the housing is placed within a back rack; and wherein the back rack is connected to the motorcycle.

17. The apparatus of claim 14 wherein the apparatus further comprises a control unit; and wherein the control unit activates the thermoelectric elements, and the first and the second fluid circulation units.

18. The apparatus of claim 17 wherein the control unit controls the polarity of the voltage supply to the thermoelectric elements.

19. The apparatus of claim 14 wherein one of the outlets of the housing is coupled to a helmet worn by a motorcyclist.

20. The apparatus of claim 14 further comprising:
   a temperature regulator, having a first and a second fluid inlets;
   a main fluid outlet and a fluid exhaust outlet, the temperature regulator for controlling the temperature of the fluid which flows through the main fluid outlet;
   wherein the first fluid circulation can force fluid to flow through the first fluid inlet of the housing, over the first heat exchanger and to the first fluid inlet of the temperature regulator;
   wherein the second fluid circulation unit, can force fluid to flow through the second fluid inlet of the housing, over the second heat exchanger, and to the second fluid inlet of the temperature regulator; and
   wherein the temperature of the fluid leaving the main fluid outlet of the temperature regulator is determined by proportioning the flow of fluid from the first fluid inlet of the temperature regulator and the fluid flow from the second fluid inlet of the temperature regulator into and through the main fluid outlet of the temperature regulator.

21. The apparatus of claim 20 wherein the main fluid outlet of the temperature regulator is coupled to the body suit.

22. The apparatus of claim 20 wherein the temperature regulator comprising:
   a piston having a single cavity, wherein the single cavity allows the fluid flow from the first and second fluid inlets of the temperature regulator to the main fluid outlet;
   wherein the temperature of the fluid leaving the main fluid outlet of the temperature regulator is determined by moving the piston in a way which changes the relative overlapping between the single cavity and the first and second fluid inlets of the temperature regulator; and
   wherein the fluid flowing from the first and second fluid inlets of the temperature regulator, which does not flow through the single cavity, is exhausted through a space confined by the piston, the first and second parts of the temperature regulator, and the temperature regulator base.

23. The apparatus of claim 22 wherein the temperature regulator further comprising:
   a sheave connected to the piston;
   a servo engine having control inputs coupled to the control unit, wherein the servo engine is connected to the sheave for moving the piston; and
   wherein the control unit sends the servo engine control signals which causes the sheave and the piston to travel in the space confined by the first and second parts of the temperature regulator.

24. The apparatus of claim 14 wherein a heating element is installed within the housing;
   wherein supplying electromagnetic energy to the heating element causes the heating element to radiate heat; and
   wherein the apparatus can be used to warm fluid by activating the heating element instead of the thermoelectric element.

25. The apparatus of claim 24 wherein the control unit has a panel with two knobs and a switch;
   wherein the first knob controls the strength of the fluid flow flowing out of the temperature regulator main fluid outlet, and for controlling the intensity of cooling and heating done by the thermoelectric elements or the heating element;
   wherein the switch determines whether to activate the thermoelectric elements or the heating elements; and
   wherein the second knob determines the temperature of the fluid flow flowing out of the temperature regulator main fluid outlet.

26. The apparatus of claim 14 further comprising a plurality of spacers;
   wherein the spacers are made of heat conductive material;
   wherein the spacers have two side plates;
   wherein the first sides of the thermoelectric elements are connected to the first plate side of the spacers;
   wherein the second plate side of each spacer is connected to the base of the second heat exchangers; and
   wherein space between the thermoelectric elements, the spacers, and the bases of the first and second heat exchange units is filled with a thermal insulating material.

27. The apparatus of claim 14 wherein the housing has a single fluid inlet, wherein the fluid which flows through the single fluid inlet is sucked by an single fluid circulation unit and then split into two parts;
   wherein a first part flows over the first heat exchanger; and
   wherein the second part flows over the second heat exchanger.

28. The apparatus of claim 14 wherein the holes are arranged in a plurality of arrays.

29. The apparatus of claim 28 wherein the suit has a collar;
   wherein the collar has a plurality of holes, for allowing fluid to flow over the neck and nape of a motorcyclist.

30. The apparatus of claim 14 wherein the body suit comprising a front and a back;
   wherein the front is connected to a plurality of attachment surfaces;
   wherein the back is connected to a plurality of a corresponding attachment surface; and
   wherein the attachment surfaces and the corresponding attachment surfaces are used to restrain the back and the front together, and to adjust the suit to its wearer.

31. The apparatus of claim 14 wherein the body suit further comprising a plurality of flexible spacers for separating the first layer from the second layer, and for allowing air to flow through a space confined by the plurality of the flexible spacers and the first layer and the second layer; and
   wherein the spacers are connected to at least one of the first layer and the second layer.

32. The apparatus of claim 31 wherein the flexible spacers have a "I" shaped cross section.

33. The apparatus of claim 14 wherein the body suit further comprises a connector for connecting the body suit to one of the outlets of the housing,
   wherein the connector comprises:
   a sheet for connecting the connector to the second layer of the body suit;
   two parallel rings placed between the first and the second layers of the body suit for allowing air to flow in a fluent manner from the housing and into the body suit;
   a third party partly surrounded by the sheet, for receiving the hose of the housing.

34. An air-conditioning apparatus, comprising:

a housing having a plurality of fluid inlets for receiving a fluid flow and a plurality of fluid outlets for receiving the fluid flow; and a heating element installed within the housing between the plurality of inlets and the plurality of outlets of the housing, wherein the fluid within the apparatus is warmed by activating the heating element.

35. The air-conditioning apparatus of claim 34, wherein the plurality of fluid inlets comprises a first fluid inlet, and the plurality of fluid outlets comprises a first fluid outlet, and wherein the heating element is installed within the housing between the first fluid inlet and the first fluid outlet.

36. The air-conditioning apparatus of claim 35, wherein the apparatus is a thermoelectric air-conditioning apparatus having a plurality of thermoelectric elements within the housing, each having a first base and a second base, in which an application of an electrical current causes a reduction of temperature in the first base and an increase of temperature in the second base.

37. The apparatus of claim 36, further comprising:

a first heat exchanger having a base plate connected to the first base plates of the plurality of thermoelectric elements, wherein at least a part of the first heat exchanger is within the housing;

a second heat exchanger within the housing, having a base plate connected to the second base plates of the plurality of thermoelectric elements; and a temperature regulator having a first and second fluid inlets, a main fluid outlet and at least one fluid exhaust outlet, for regulating the temperature of the fluid flow outputted through the main fluid outlet.

38. The apparatus of claim 37 further comprising:

a first fluid circulation unit within the housing, for forcing fluid to flow through one of the plurality of the housing fluid inlets over the first heat exchanger and to the first fluid inlet of the temperature regulator;

a second fluid circulation unit within the housing, for forcing fluid to flow through one of the plurality of the housing fluid inlets over the second heat exchanger and to the second fluid inlet of the temperature regulator;

a control unit coupled to the temperature regulator, for controlling the temperature of the fluid flow through the main fluid outlet of the temperature regulator, wherein the temperature of the fluid leaving the main fluid outlet of the temperature regulator is determined by proportioning the flow of fluid from the first fluid inlet of the temperature regulator and the fluid flow from the second fluid inlet of the temperature regulator into and through the main fluid outlet of the temperature regulator.

* * * * *